(12) United States Patent
Prasad et al.

(10) Patent No.: US 11,537,279 B2
(45) Date of Patent: Dec. 27, 2022

(54) SYSTEM AND METHOD FOR ENHANCING AN EXPRESSION OF A DIGITAL PICTORIAL IMAGE

(71) Applicant: TALENT UNLIMITED ONLINE SERVICES PRIVATE LIMITED, Delhi (IN)

(72) Inventors: Ankit Prasad, Gurugram (IN); Rahul Prasad, Gurugram (IN)

(73) Assignee: TALENT UNLIMITED ONLINE SERVICES PRIVATE LIMITED, Delhi (IN)

(*) Notice: Subject to any disclaimer, the term of this patent is extended or adjusted under 35 U.S.C. 154(b) by 4 days.

(21) Appl. No.: 17/343,370

(22) Filed: Jun. 9, 2021

(65) Prior Publication Data

US 2021/0382610 A1    Dec. 9, 2021

(30) Foreign Application Priority Data

Jun. 9, 2020 (IN) .............................. 202011024080

(51) Int. Cl.
| | |
|---|---|
| *G06F 3/048* | (2013.01) |
| *G06F 3/04845* | (2022.01) |
| *G06F 3/0482* | (2013.01) |
| *H04L 51/10* | (2022.01) |
| *G06T 11/60* | (2006.01) |
| *G06T 3/40* | (2006.01) |
| *G06F 3/04886* | (2022.01) |

(52) U.S. Cl.
CPC ........ *G06F 3/04845* (2013.01); *G06F 3/0482* (2013.01); *G06F 3/04886* (2013.01); *G06T 3/40* (2013.01); *G06T 11/60* (2013.01); *H04L 51/10* (2013.01)

(58) Field of Classification Search
None
See application file for complete search history.

(56) References Cited

U.S. PATENT DOCUMENTS

| | | | | |
|---|---|---|---|---|
| 10,855,632 | B2* | 12/2020 | Kennedy | G06F 3/0481 |
| 11,108,721 | B1* | 8/2021 | Roberts | H04L 51/18 |
| 2005/0160149 | A1* | 7/2005 | Durand | G06Q 10/107 |
| | | | | 709/206 |
| 2017/0308293 | A1* | 10/2017 | Lee | G06F 3/04845 |
| 2019/0204868 | A1* | 7/2019 | Choi | H04M 1/725 |

* cited by examiner

*Primary Examiner* — William C Trapanese
(74) *Attorney, Agent, or Firm* — Barry Choobin; Patent 360 LLC

(57) ABSTRACT

A system and a method are provided for enhancing an expression of a digital pictorial image on a graphical user interface (GUI) of an electronic device. An expression enhancing engine (EEE) in the system receives a user selection of the digital pictorial image via an input interface, in communication with a sensing unit. The EEE enhances the expression of the digital pictorial image in real time by modifying a size of the digital pictorial image to a selected scaling size; retrieving media content associated with the user selection of the digital pictorial image from a data storage device; and reconstructing the digital pictorial image of the modified size with the media content. The EEE, in operable communication with a media playback device, renders the reconstructed digital pictorial image with the media content on the GUI in real time.

15 Claims, 18 Drawing Sheets

| Emoji Sticker | |
|---|---|
| Identifier | Data Type |
| id | Integer |
| emoji | String |
| image | String, nullable |
| send_sound | String, nullable |
| enlarge_sound | String, nullable |

FIG. 6A

| Example Data | |
|---|---|
| Identifier | Data Type |
| id | 1 |
| emoji | "♥" |
| image | "heart_emoji_image.png" |
| send_sound | "heart_emoji_send_sound.mp3" |
| enlarge_sound | "heart_emoji_enlarge_sound.mp3" |

FIG. 6B

| Watermarks | | | | | |
|---|---|---|---|---|---|
| emojis | placements | | | | |
| default | url | | width | left | top |
| | https://assets.xyzkeyboard.net/watermark/xyz-watermark-v1.png | | 0.25 | 0.0195 | 0.85 |
| Sounds | | | | | |
| emojis | enlargeAudioURL | | sendAudioURL | | |
| 😂😂😂 | https://assets.xyzkeyboard.net/emoji-stickers/audios/emoji_laugh_enlarge_sound.mp3 | | https://assets.xyzkeyboard.net/emoji-stickers/audios/emoji_laugh_send_sound.mp3 | | |
| Images | | | | | |
| emojis | url | | | | |
| 😂 | https://assets.xyzkeyboard.net/emoji-stickers/images/emoji_laughing.png | | | | |
| 😂 | https://assets.xyzkeyboard.net/emoji-stickers/images/emoji_laughing.png | | | | |

SYSTEM AND METHOD FOR ENHANCING AN EXPRESSION OF A DIGITAL PICTORIAL IMAGE

CROSS-REFERENCE TO RELATED APPLICATIONS

This application claims priority to and the benefit of the non-provisional patent application titled "System and Method for Enhancing an Expression of a Digital Pictorial Image", application number 202011024080, filed in the Indian Patent Office on Jun. 9, 2020. The specification of the above referenced patent application is incorporated herein by reference in its entirety.

BACKGROUND

Technical Field

The present invention, in general, relates to digital image processing and communication using digital pictorial images. More particularly, the present invention relates to a system and a method for enhancing an expression of a digital pictorial image.

Description of the Related Art

New forms of communication have emerged through social and digital media platforms. Digital pictorial images, for example, ideograms or ideographs such as emojis, pictographs, stickers, etc., have changed the way users of multi-purpose mobile computing devices such as smartphones communicate with each other. Users typically insert digital pictorial images into messages, for example, instant messages, direct messages, chat messages, electronic mail (email) messages, short message service (SMS) text messages, etc. As part of everyday communication, these digital pictorial images project an expression succinctly and are used to convey ideas, nuances, emotions, expressions, and other cues of communication by softening a tone of a message or by emphasizing the message. These digital pictorial images evoke different reactions in different users in different geographical locations across language and cultural diversity. Many social and digital media platforms report an exchange of millions of emojis everyday through various user applications such as messaging applications, email applications, chat platforms, gaming applications, etc.

Digital pictorial images insert tone, expression, and body language into a message, which would otherwise be mere, plain text. However, users who wish to communicate through emojis are restricted to selecting emojis from a limited set of emojis provided by a user application. These emojis are typically not interactive or have any effects that allow a user to convey an expression in a more interactive and optimal manner. Furthermore, these emojis are typically not adapted to convey expressions that are related to a context of a message or a specific culture or a geographical location. In conventional user applications, for example, messengers or chat applications, a user may be allowed to select an emoji to replace a word in a conversation without any interactive elements or effects. If a user wishes to share a large-sized emoji while chatting, the user typically has to download an image of the emoji from the internet and share the downloaded image.

Hence, there is a long-felt need for a system and a method for enhancing an expression of a digital pictorial image on a graphical user interface of an electronic device to improve user interactions and meet interactive demands of device-based conversations such as smartphone conversations between users. Moreover, there is a need for a quick input method for sharing an enlarged, interactive digital pictorial image with media content, for example, animation, sound effects, etc., through a user application in real time.

OBJECTS OF THE EMBODIMENTS HEREIN

An object of the present invention is to develop a system and a method for enhancing an expression of a digital pictorial image, for example, an emoji, a product image, etc., on a graphical user interface (GUI) of an electronic device to improve user interactions and meet interactive demands of device-based conversations such as smartphone conversations between users.

Another object of the present invention is to provide quick input methods for sharing an enlarged, interactive digital pictorial image with media content of different types, for example, animations, sound effects, etc., through a user application in real time.

Yet another object of the present invention is to provide input methods to introduce custom stickers mapped with regular emojis.

Yet another object of the present invention is to convert a digital pictorial image into a similar looking image that conveys an expression more appropriately.

Yet another object of the present invention is to modify the size of a digital pictorial image to a scaling size selected by a user.

Yet another object of the present invention is to reconstruct a digital pictorial image with media content of different types, for example, textual content, image content, audio content, video content, audiovisual content, multimedia content, etc., to enhance and improve the interactivity of the digital pictorial image.

Yet another object of the present invention is to reconstruct a digital pictorial image based on a location of an electronic device.

Yet another object of the present invention is to render or playback the reconstructed digital pictorial image with the media content on a sender device and/or a recipient device in real time.

Yet another object of the present invention is to render the digital pictorial image with a modified size free of the retrieved media content on the GUI displayed on a display unit in real time.

Yet another object of the present invention is to map digital pictorial images with brands selling a product in the same category.

Yet another object of the present invention is to allow users to customize the digital pictorial images based on user preferences.

The objects disclosed above will be realized and achieved at least by the elements, features, and combinations particularly pointed out in the detailed description of the present invention. The objects disclosed above have outlined, rather broadly, the features of the present invention in order that the detailed description that follows may be better understood. The objects disclosed above are not intended to determine the scope of the claimed subject matter and are not to be construed as limiting of the present invention. Additional objects, features, and advantages of the present invention are disclosed below. The objects disclosed above, which are believed to be characteristic of the present invention, both as to its organization and method of operation, together with further objects, features, and advantages, will be better understood and illustrated by the technical features broadly embodied and described in the following description when considered in connection with the accompanying drawings.

SUMMARY

This summary is provided to introduce a selection of concepts in a simplified form that are further disclosed in the detailed description. This summary is not intended to determine the scope of the claimed subject matter.

The present disclosure comprises a system for enhancing an expression of a digital pictorial image on a graphical user interface of an electronic device. The system comprises an electronic device that includes an input device, at least one processor, a memory unit operably and communicatively coupled to the at least one processor, and a display unit. The system further comprises a sensing unit comprising one or more of a plurality of sensors operably coupled to the at least one processor of the electronic device, and an expression enhancing engine operably coupled to the sensing unit, the at least one processor, and a messaging application deployed on the electronic device. Further, the expression enhancing engine comprises multiple modules including an input detection module configured to receive a user selection of the digital pictorial image from the input device the electronic device, in communication with the sensing unit. The expression enhancing engine further comprises an image reconstruction module configured to enhance the expression of the digital pictorial image in real time by modifying size of the digital pictorial image to a selected one of a preconfigured number of scaling sizes, retrieving media content associated with the user selection of the digital pictorial image from a data storage device, and reconstructing the digital pictorial image with the retrieved media content. Lastly, the expression enhancing engine further comprises a display module configured to render the reconstructed digital pictorial image on the graphical user interface displayed on the display unit in real time.

The present invention addresses the need for a system and a method for enhancing an expression of a digital pictorial image, for example, an emoji, a product image, etc., on a graphical user interface (GUI) of an electronic device to improve user interactions and meet interactive demands of device-based conversations such as smartphone conversations between users. Moreover, the present invention provides quick input methods for sharing an enlarged, interactive digital pictorial image with media content of different types, for example, animations, sound effects, etc., through a user application in real time.

The system disclosed herein comprises an electronic device, a sensing unit, and an expression enhancing engine. The electronic device comprises at least one processor, a memory unit operably and communicatively coupled to the processor(s), a media playback device, and a display unit. The sensing unit comprises one or more of a plurality of sensors operably coupled to the processor(s) of the electronic device. The expression enhancing engine is operably coupled to the sensing unit and the processor(s). In an embodiment, the expression enhancing engine is invoked through a user application, for example, a messaging application, an electronic mail (email) application, a gaming application, a media application, a business communication application, an electronic commerce (e-commerce) application, etc., deployed on the electronic device and operably coupled to the expression enhancing engine.

In the system and the method disclosed herein, the expression enhancing engine is configured to receive a user selection of the digital pictorial image via an input interface, in communication with the sensing unit. The input interface comprises, for example, a touch-enabled keyboard interface, a voice-enabled input interface, a gesture-enabled input interface, a camera-enabled input interface, an image selection input interface, etc., or any combination thereof, for facilitating the user selection of the digital pictorial image. In an embodiment, the expression enhancing engine is configured to receive the user selection of the digital pictorial image via one of a plurality of input actions, for example, a long press action, on the input interface. The expression enhancing engine is configured to enhance the expression of the digital pictorial image in real time by modifying a size of the digital pictorial image to a selected one of a preconfigured number of scaling sizes; retrieving media content associated with the user selection of the digital pictorial image from a data storage device; and reconstructing the digital pictorial image of the modified size with the retrieved media content. The media content comprises, for example, textual content, image content, audio content, video content, audiovisual content, multimedia content, etc., or any combination thereof. In an embodiment, the expression enhancing engine is configured to render a customization interface on the display unit for receiving media content from a user to customize the digital pictorial image based on user preferences.

In an embodiment, during the reconstruction of the digital pictorial image, the expression enhancing engine is configured to map a unicode corresponding to the digital pictorial image to a digital replacement image. In an embodiment, the expression enhancing engine is operably coupled to a global positioning system (GPS) component for reconstructing the digital pictorial image of the modified size based on a location of the electronic device. In another embodiment, the expression enhancing engine is configured to generate a digital sticker from the reconstructed digital pictorial image and one or more other reconstructed digital pictorial images based on the scaling size selected by the user via the input interface.

The expression enhancing engine, in operable communication with the media playback device, is configured to render the reconstructed digital pictorial image with the retrieved media content on the GUI displayed on the display unit in real time. The expression enhancing engine is configured to playback audio content during the rendering of the reconstructed digital pictorial image on the GUI in real time. In an embodiment, the expression enhancing engine is configured to render the reconstructed digital pictorial image with the retrieved media content on a sender device and/or a recipient device. In an embodiment, the expression enhancing engine is configured to render the digital pictorial image of the modified size free of the retrieved media content on the GUI displayed on the display unit in real time.

In one or more embodiments, related systems comprise circuitry and/or programming for effecting the present invention. In an embodiment, the circuitry and/or programming are any combination of hardware, software, and/or firmware configured to implement the present invention depending upon the design choices of a system designer. Also, in an embodiment, various structural elements are employed depending on the design choices of the system designer.

BRIEF DESCRIPTION OF THE DRAWINGS

The foregoing summary, as well as the following detailed description, is better understood when read in conjunction with the appended drawings. For illustrating the present invention, exemplary constructions of the present invention are shown in the drawings. However, the present invention is not limited to the specific components and methods disclosed herein. The description of a component or a method step referenced by a numeral in a drawing is applicable to the description of that component or method step shown by that same numeral in any subsequent drawing herein.

FIG. 6A illustrates an exemplary database schema implemented by the system for enhancing an expression of a digital pictorial image on a graphical user interface of an electronic device, according to an embodiment of the present invention.

FIG. 6B illustrates exemplary data stored in a database of the system for enhancing an expression of a digital pictorial image on a graphical user interface of an electronic device, according to an embodiment of the present invention.

FIG. 7 illustrates a mapping interface generated by the expression enhancing engine for enhancing an expression of a digital pictorial image on a graphical user interface of an electronic device, according to an embodiment of the present invention.

DETAILED DESCRIPTION

Figure 1:
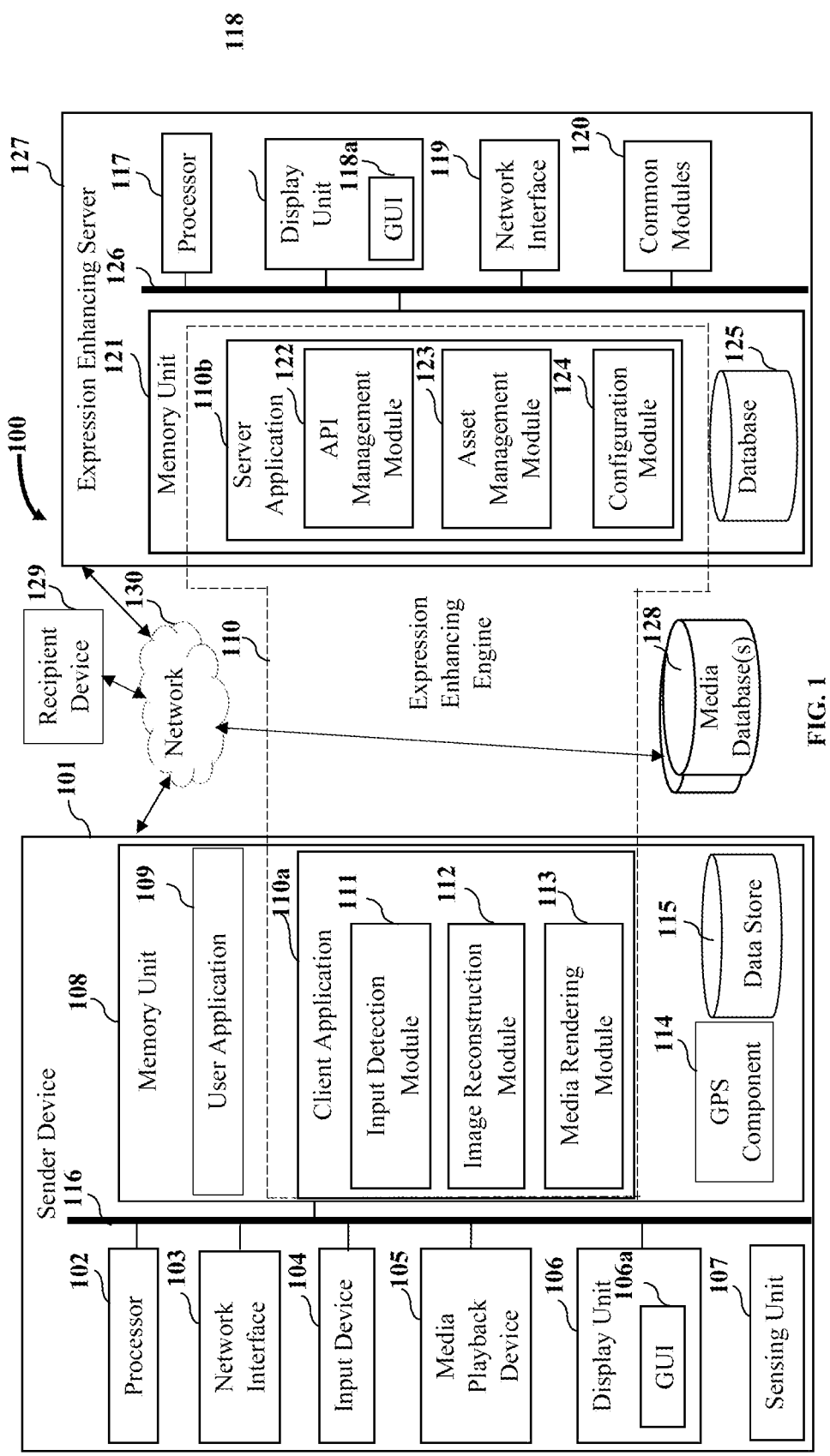
FIG. 1 illustrates an architectural block diagram of an exemplary implementation of a system for enhancing an expression of a digital pictorial image on a graphical user interface of an electronic device, according to an embodiment of the present invention.

FIG. 1 illustrates an architectural block diagram of an exemplary implementation of a system 100 for enhancing an expression of a digital pictorial image on a graphical user interface (GUI) 106a of an electronic device 101, according to an embodiment of the present invention. As used herein, "digital pictorial image" refers to a digital image comprising one or more graphical symbols that graphically and pictorially represent, for example, an idea, a concept, a product, and/or a service. The digital pictorial image is, for example, an ideogram, an ideograph, or a pictogram such as an emoji or a smiley. In an embodiment, the digital pictorial image is a product image. Also, as used herein, the term "expression" refers to an element of communication that displays and conveys ideas, nuances, emotions, facial expressions, reactions, verbal and non-verbal behaviour, and other cues of communication. Various aspects of the present invention may be embodied as a system, a method, or a non-transitory, computer-readable storage medium having one or more computer-readable program codes stored thereon. Accordingly, various embodiments of the present invention may take the form of an entirely hardware embodiment, an entirely software embodiment comprising, for example, microcode, firmware, software, etc., or an embodiment combining software and hardware aspects that may be referred to herein as a "system", a "module", an "engine", a "circuit", or a "unit". As used herein, "non-transitory, computer-readable storage medium" refers to all computer-readable storage media that contains and stores computer programs and data. Examples of the computer-readable storage media comprise hard drives, solid state drives, optical discs or magnetic disks, memory chips, a read-only memory (ROM), a register memory, a processor cache, a random-access memory (RAM), etc.

The system 100 disclosed herein is accessible to users, for example, through a broad spectrum of technologies and user devices such as smartphones, personal computers, internet-enabled cellular phones, tablet computing devices, etc., with access to a network 130, for example, a short-range network or a long-range network. The network 130 is, for example, one of the internet, an intranet, a wired network, a wireless network, a communication network that implements Bluetooth® of Bluetooth Sig, Inc., a network that implements Wi-Fi® of Wi-Fi Alliance Corporation, an ultra-wideband (UWB) communication network, a wireless universal serial bus (USB) communication network, a communication network that implements ZigBee® of ZigBee Alliance Corporation, a general packet radio service (GPRS) network, a mobile telecommunication network such as a global system for mobile (GSM) communications network, a code division multiple access (CDMA) network, a third generation (3G) mobile communication network, a fourth generation (4G) mobile communication network, a fifth generation (5G) mobile communication network, a long-term evolution (LTE) mobile communication network, a public telephone network, etc., a local area network, a wide area network, an internet connection network, an infrared communication network, etc., or a network formed from any combination of these networks. The system 100 disclosed herein comprises an electronic device, that is, a sender device 101, an expression enhancing engine 110, and a recipient device 129 accessible via the network 130. The sender device 101 communicates with the recipient device 129 via the network 130. As used herein, "sender device" refers to an electronic device through which a user, that is, a sender, sends an electronic communication, for example, an instant message, a chat message, an electronic mail (email) message, etc., to the recipient device 129. Also, as used herein, "recipient device" refers to an electronic device through which another user, that is, a recipient, receives the electronic communication from the sender device 101.

The electronic device, that is, the sender device 101 or the recipient device 129 is, for example, one or more of a personal computer, a tablet computing device, a mobile computer, a mobile phone, a smart phone, a portable computing device, a laptop, a personal digital assistant, a wearable computing device such as smart glasses, a smart watch, etc., a touch centric device, a workstation, a client device, a portable electronic device, a network-enabled computing device, an interactive network-enabled communication device, a gaming device, a television, an image capture device, a web browser, a portable media player, any entertainment system, any other suitable computing equipment, combinations of multiple pieces of computing equipment, etc. In an embodiment, the electronic device is a hybrid device that combines the functionality of multiple devices. Examples of a hybrid electronic device comprise a cellular telephone that includes messaging and media player functionality, a gaming device that includes a wireless communications capability, a cellular telephone that includes message, game and email functions, and a portable device that receives email, supports mobile telephone calls, has music player functionality, and supports web browsing. In an embodiment, computing equipment is used to implement user applications 109 such as messaging applications, chat applications, media playback applications, web browsers, a mapping application, email applications, calendar applications, social media applications, etc.

In an embodiment, the expression enhancing engine 110 is implemented using programmed and purposeful hardware of the sender device 101. In the exemplary implementation of the system 100 illustrated in FIG. 1, the expression enhancing engine 110 is configured as a client-server system comprising a client application 110a deployed on the sender device 101 and in an embodiment on the recipient device 129, and a server application 110b deployed on an expression enhancing server 127. The client application 110a on the sender device 101 and/or the recipient device 129 communicates with the server application 110b on the expression enhancing server 127 via the network 130. In another embodiment, the expression enhancing engine 110 is implemented completely on the client side.

In an exemplary implementation of the system 100 as illustrated in FIG. 1, the sender device 101 comprises at least one processor 102, a network interface 103, an input device 104, a memory unit 108 operably and communicatively coupled to the processor(s) 102, a sensing unit 107, a media playback device 105, a display unit 106, and a data bus 116. The input device 104 is, for example, a keyboard such as an alphanumeric keyboard, a joystick, a pointing device such as a computer mouse, a touch pad, a light pen, a digital pen, a microphone for providing voice input, a digital camera, a physical button, a touch sensitive display device, a track ball, a pointing stick, any device capable of sensing a tactile input, etc.

In an embodiment, the processor 102 is operably and communicatively coupled to the memory unit 108 for executing computer program instructions defined by the modules, for example, 111, 112, and 113 of the expression enhancing engine 110. The processor 102 refers to any one or more microprocessors, central processing unit (CPU) devices, finite state machines, computers, microcontrollers, digital signal processors, logic, a logic device, an application specific integrated circuit (ASIC), a field-programmable gate array (FPGA), a chip, etc., or any combination thereof, capable of executing computer programs or a series of commands, instructions, or state transitions. In an embodiment, the processor 102 is implemented as a processor set comprising, for example, a programmed microprocessor and a math or graphics co-processor. The expression enhancing engine 110 is not limited to employing the processor 102. In an embodiment, the expression enhancing engine 110 employs controllers or microcontrollers.

The memory unit 108 stores applications, data, and computer program instructions defined by the modules, for example, 111, 112, and 113 of the expression enhancing engine 110. The memory unit 108 is, for example, a random-access memory (RAM) or another type of dynamic storage device that stores information and instructions for execution by the processor 102. The memory unit 108 also stores temporary variables and other intermediate information used during execution of the instructions by the processor 102. The sender device 101 further comprises read only memories (ROMs) or other types of static storage devices that store static information and instructions for execution by the processor 102. In an embodiment, the modules, for example, 111, 112, and 113 of the expression enhancing engine 110 are stored in the memory unit 108 as illustrated in FIG. 1.

The network interface 103 enables connection of the expression enhancing engine 110 to the network 130. In an embodiment, the network interface 103 is provided as an interface card also referred to as a line card. The network interface 103 is, for example, one or more of infrared interfaces, interfaces implementing Wi-Fi® of Wi-Fi Alliance Corporation, universal serial bus interfaces, FireWire® interfaces of Apple Inc., Ethernet interfaces, frame relay interfaces, cable interfaces, digital subscriber line interfaces, token ring interfaces, peripheral controller interconnect interfaces, local area network interfaces, wide area network interfaces, interfaces using serial protocols, interfaces using parallel protocols, Ethernet communication interfaces, asynchronous transfer mode interfaces, high speed serial interfaces, fiber distributed data interfaces, interfaces based on transmission control protocol/internet protocol, interfaces based on wireless communications technology such as satellite technology, radio frequency technology, near field communication, etc. The sender device 101 comprises common modules, for example, input/output (I/O) controllers, output devices, fixed media drives such as hard drives, removable media drives for receiving removable media, etc. Computer applications and programs are used for operating the user application 109 and the client application 110a. The programs are loaded onto fixed media drives and into the memory unit 108 via the removable media drives. In an embodiment, the computer applications and programs are loaded into the memory unit 108 directly via the network 130. The data bus 116 permits communications between the modules, for example, 102, 103, 104, 105, 106, 107, and 108 of the sender device 101.

The sensing unit 107 comprises one or more sensors operably coupled to the processor 102 of the sender device 101. The sensors comprise, for example, tactile sensors, image sensors, motion sensors, gesture sensors, etc., and other sensors configured to receive inputs of different types from a user. In the system 100 disclosed herein, the expression enhancing engine 110 is operably coupled to the sensing unit 107 and the processor 102. In an embodiment, the expression enhancing engine 110 is invoked through a user application 109, for example, a messaging application, a business communication application, an electronic commerce (e-commerce) application, an email application, a gaming application, a media application, etc., deployed on the sender device 101 and operably coupled to the expression enhancing engine 110.

In an embodiment, the expression enhancing engine 110 comprises multiple modules defining computer program instructions, which when executed by the processor 102, cause the processor 102 to enhance an expression of a digital pictorial image on the GUI 106a of the sender device 101. When a user launches a user application 109, for example, a messaging application on the sender device 101, the expression enhancing engine 110 launches an input interface through the user application 109 to allow the user to select a digital pictorial image for sending to the recipient device 129. As used herein, "input interface" refers to any user interface invoked within or external to a user application, that displays digital pictorial images for selection by a user through any input action, for example, a long press action, a voice input action, a gesture input action, etc. The input interface comprises, for example, a touch-enabled keyboard interface, a voice-enabled input interface, a gesture-enabled input interface, a camera-enabled input interface, an image selection input interface, etc., or any combination thereof, for facilitating the user selection of the digital pictorial image.

In an example, the expression enhancing engine 110 launches a touch-enabled keyboard interface through the user application 109 to allow the user to select a digital pictorial image from a row displayed on the touch-enabled keyboard interface for sending to the recipient device 129. In another example, the expression enhancing engine 110 launches an image selection input interface such as an emoji bar displaying a list of emojis for selection by the user within the user application 109. On clicking the digital pictorial image on the input interface, for example, the touch-enabled keyboard interface or the image selection input interface, the user selects an image representation of a unicode corresponding to the digital pictorial image. In the exemplary implementation of the system 100 illustrated in FIG. 1, the client application 110a that constitutes the expression enhancing engine 110 comprises an input detection module 111, an image reconstruction module 112, and a media rendering module 113. The input detection module 111, the image reconstruction module 112, and the media rendering module 113 of the client application 110a, when loaded into the memory unit 108 and executed by the processor 102, transform the sender device 101 into a specially-programmed, special purpose electronic device configured to implement the functionality disclosed herein.

The input detection module 111 receives a user selection of the digital pictorial image from the input interface displayed on the sender device 101, in communication with the sensing unit 107. In an embodiment, the input detection module 111 receives the user selection of the digital pictorial image via one of multiple input actions, for example, a long press action, on the input interface. For example, when the user performs a long press action on a selected digital pictorial image on the touch-enabled keyboard interface that displays digital pictorial images, the input detection module 111 receives the selected digital pictorial image via the touch-enabled keyboard interface for subsequent image reconstruction. In another example, when the user performs a long press action on a selected digital pictorial image on the image selection input interface such as the emoji bar that displays emojis within the user application 109, the input detection module 111 receives the selected digital pictorial image via the image selection input interface for subsequent image reconstruction. In another example, the input detection module 111 receives voice inputs that convey the selection of the digital pictorial image via a voice-enabled input interface for subsequent image reconstruction. In another example, the input detection module 111 receives finger-based gestures, hand-based gestures, or other gestures that convey the selection of the digital pictorial image via a gesture-enabled input interface for subsequent image reconstruction.

Figure 3A:
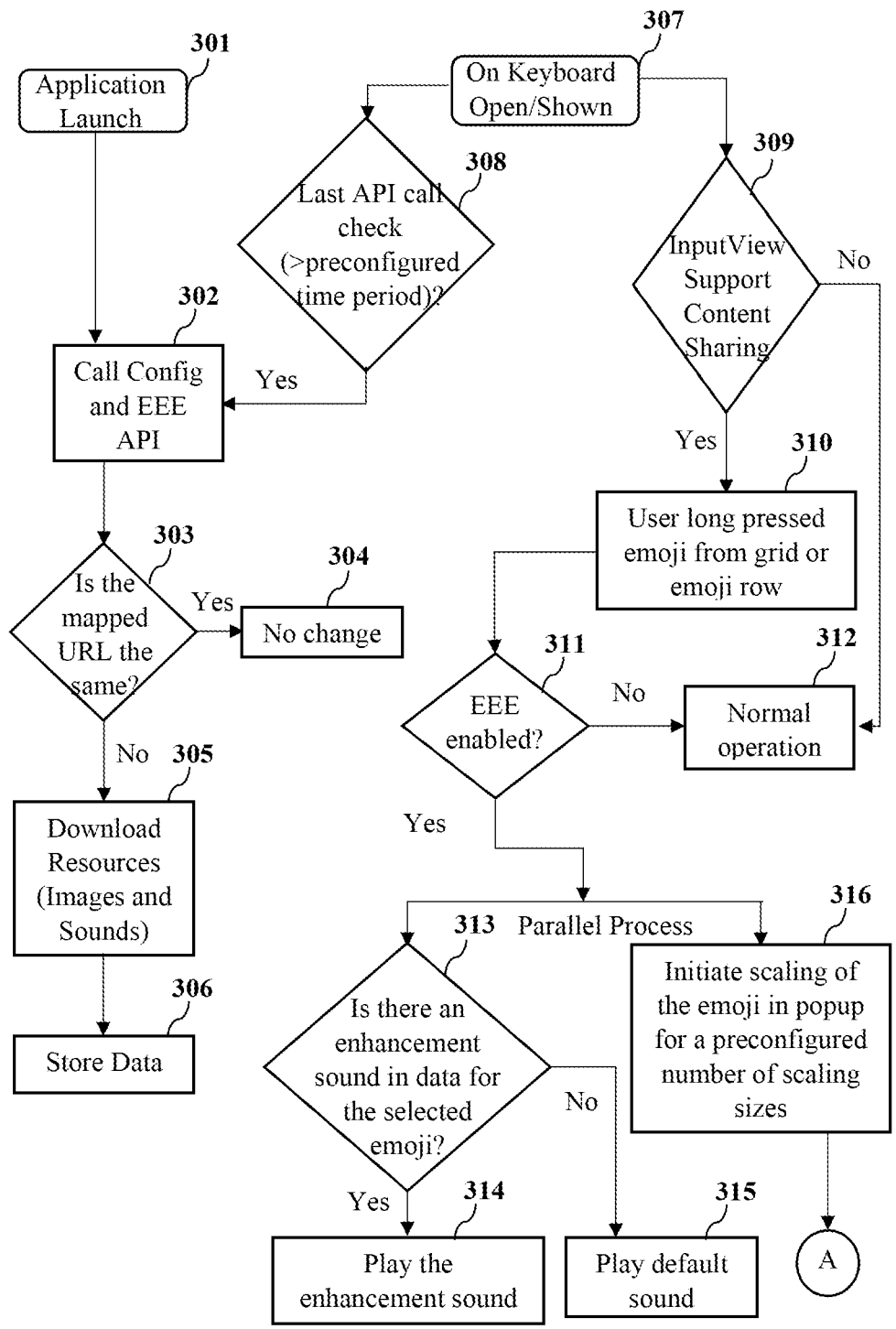
FIGS. 3A-3B illustrate a flowchart of a method for enhancing an expression of an emoji on a graphical user interface of an electronic device, according to an embodiment of the present invention.
Figure 3B:
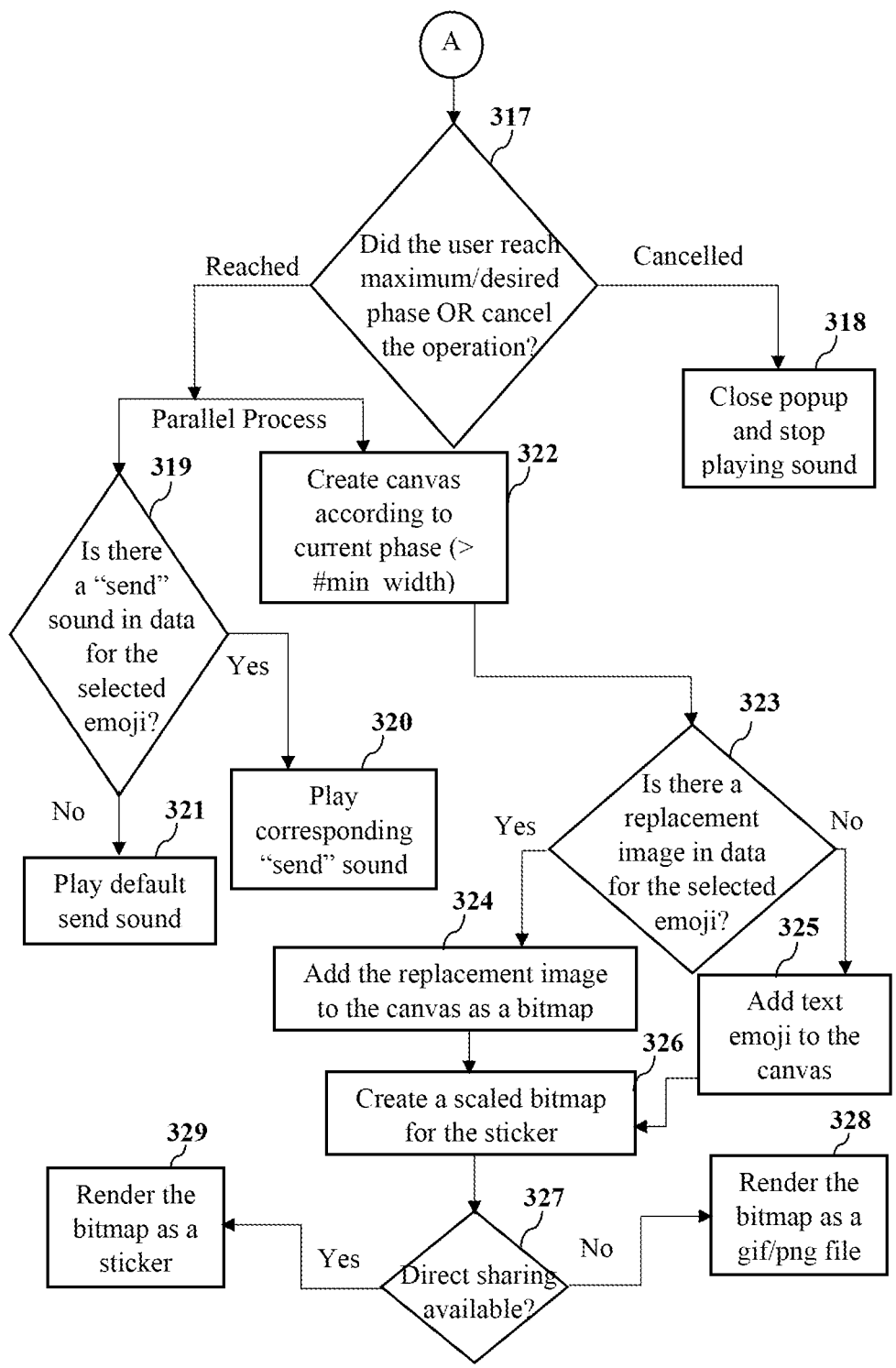

The image reconstruction module 112 enhances the expression of the digital pictorial image in real time by modifying a size of the digital pictorial image to a selected one of a preconfigured number of scaling sizes; retrieving media content associated with the user selection of the digital pictorial image from a data storage device, for example, a media database 128 via the network 130; and reconstructing the digital pictorial image of the modified size with the retrieved media content as disclosed in the detailed description of FIGS. 3A-3B. The media content comprises, for example, textual content, image content, audio content, video content, audiovisual content, multimedia content, etc., or any combination thereof. In an embodiment, the media content comprises branding data and/or advertising data for reconstruction of a digital pictorial image such as a product image into a branded product image. In this embodiment, the image reconstruction module 112 maps the digital pictorial image with brands selling a product in a category. For example, the image reconstruction module 112 enlarges the size of a chocolate emoji and inserts a brand logo to the chocolate emoji to generate a digital sticker.

Figure 12A:
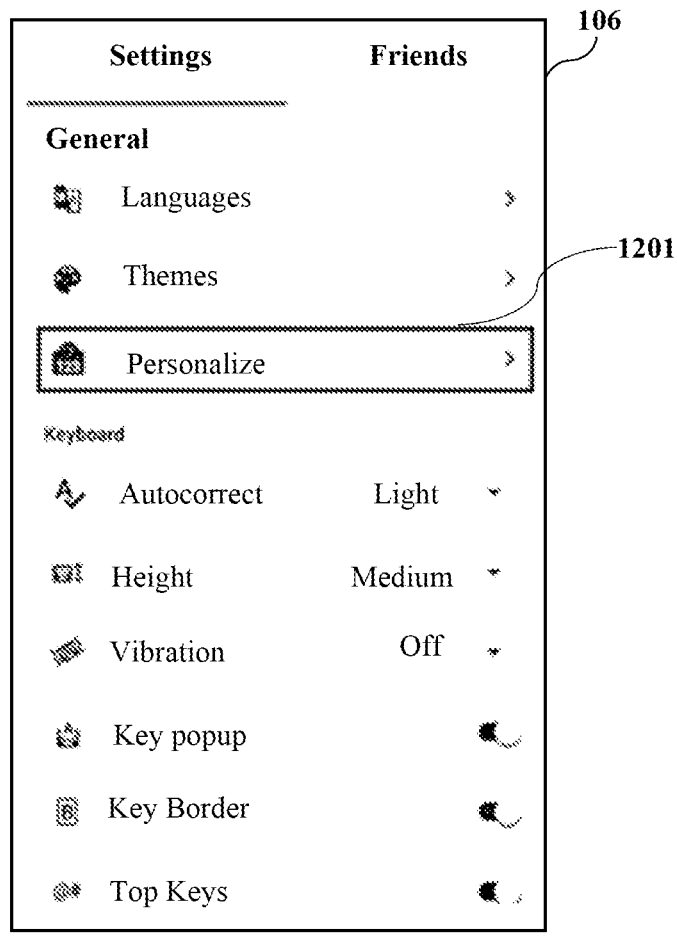
FIGS. 12A-12B illustrate screenshots of a customization interface rendered by the expression enhancing engine for customizing a digital pictorial image based on user preferences, according to an embodiment of the present invention.
Figure 12B:
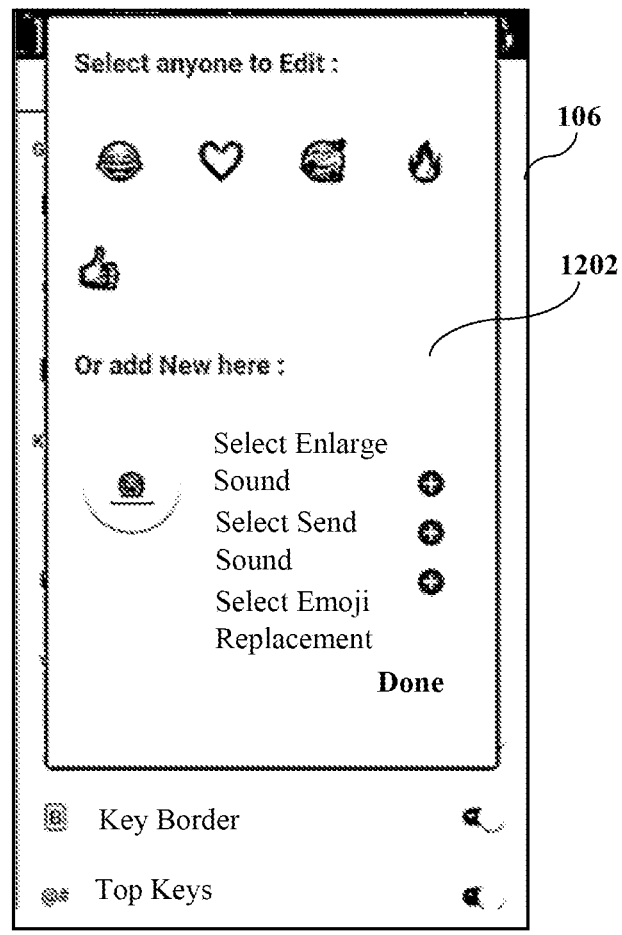

On retrieving the media content from the media database 128 via the network 130, the client application 110a stores the media content in a data store 115 in the memory unit 108. In an embodiment, the image reconstruction module 112 renders a customization interface 1202 on the display unit 106 as illustrated in FIGS. 12A-12B, for receiving media content from a user to customize the digital pictorial image based on user preferences. The display unit 106, via a graphical user interface (GUI) 106a, displays messages, digital pictorial images, the reconstructed digital pictorial image information, display interfaces, customization interfaces, media content, user interface elements such as checkboxes, input text fields, etc., for example, for allowing a user to invoke and execute the expression enhancing engine 110, select digital pictorial images for reconstruction, select media content for customizing the digital pictorial image, etc. The GUI 106a comprises, for example, online web interfaces, web-based downloadable application interfaces, mobile-based downloadable application interfaces, etc.

In an embodiment, during the reconstruction of the digital pictorial image, the image reconstruction module 112 maps a unicode corresponding to the digital pictorial image to a digital replacement image. The image reconstruction module 112 uses the digital replacement image to replace the digital pictorial image selected by the user. In an embodiment, the image reconstruction module 112 is operably coupled to a global positioning system (GPS) component 114 for reconstructing the digital pictorial image based on a location of the sender device 101. For example, on determining the location and date of the sender device 101 from the GPS component 114, the image reconstruction module 112 determines a particular festival being celebrated at the location and reconstructs the digital pictorial image of the modified size with media content, for example, animations and sound effects associated with the festival. In another embodiment, the image reconstruction module 112 generates a digital sticker from the reconstructed digital pictorial image and one or more other reconstructed digital pictorial images based on the scaling size selected by the user via the input interface as disclosed in the detailed description of FIGS. 5A-5B.

The media rendering module 113, in operable communication with the media playback device 105, for example, device speakers or other audio output devices, renders the reconstructed digital pictorial image with the retrieved media content on the GUI 106a displayed on the display unit 106 in real time. The media rendering module 113 plays back audio content, for example, through an audio output device of the sender device 101 during the rendering of the reconstructed digital pictorial image on the GUI 106a in real time. In an embodiment, the media rendering module 113 renders the reconstructed digital pictorial image with the retrieved media content on the sender device 101 and/or the recipient device 129. In another embodiment, the media rendering module 113 renders the digital pictorial image of the modified size, for example, an enlarged size, free of the retrieved media content on the GUI 106a displayed on the display unit 106 as illustrated in FIGS. 9A-9D, in real time.

The input detection module 111, the image reconstruction module 112, and the media rendering module 113 of the client application 110a are disclosed above as software executed by the processor 102. In an embodiment, the modules, for example, 111, 112, and 113 of the expression enhancing engine 110 are implemented completely in hardware. In another embodiment, the modules, for example, 111, 112, and 113 of the expression enhancing engine 110 are implemented by logic circuits to carry out their respective functions disclosed above. The processor 102 retrieves and executes instructions defined by the input detection module 111, the image reconstruction module 112, and the media rendering module 113 from the memory unit 108 for performing respective functions disclosed above.

In the exemplary implementation of the system 100 illustrated in FIG. 1, the expression enhancing server 127 comprises at least one processor 117, a display unit 118, a network interface 119, and a memory unit 121 similar to the display unit 106, the network interface 103, and the memory unit 108 of the sender device 101 respectively as disclosed above. The memory unit 121 stores applications, data, and computer program instructions defined by the modules, for example, 122, 123, and 124 of the server application 110b of the expression enhancing engine 110. The expression enhancing server 127 comprises a data bus 126 for permitting communications between the modules, for example, 117, 118, 119, 120, and 121 of the expression enhancing server 127. The expression enhancing server 127 comprises common modules 120, for example, input/output (I/O) controllers, input devices, output devices, fixed media drives such as hard drives, removable media drives for receiving removable media, etc. Computer applications and programs are used for operating the server application 110b. The programs are loaded onto fixed media drives and into the memory unit 121 via the removable media drives. In an embodiment, the computer applications and programs are loaded into the memory unit 121 directly via the network 130. The display unit 118, via a GUI 118a, displays configuration data, mapping data, etc., for example, for allowing a system administrator to configure the data for the client application 110a.

In the exemplary implementation of the system 100 illustrated in FIG. 1, the server application 110b comprises an application programming interface (API) management module 122, an asset management module 123, and a configuration module 124. The API management module 122, the asset management module 123, and the configuration module 124 of the server application 110b, when loaded into the memory unit 121 and executed by the processor 117, transform the expression enhancing server 127 into a specially-programmed, special purpose computing device configured to implement the functionality disclosed herein. The API management module 122 responds to API calls and configuration calls from the sender device 101 via the network 130. The asset management module 123 manages pairs mapped to the digital pictorial image. The pairs comprise, for example, uniform resource locators (URLs) to sound or audio files, assets such as replaceable stickers, watermarks, etc., mapped to the digital pictorial image. The configuration module 124 manages configuration data comprising data for operating the client application 110a on the sender device 101, data used to change the behaviour of the client application 110a on the sender device 101, etc. The configuration module 124 stores the configuration data in a database 125. In an embodiment, the configuration module 124 provides a configuration dashboard that allows system administrators to add configuration data that can be downloaded by the client application 110a on the sender device 101. In another embodiment, the configuration module 124 allows creators to map digital pictorial images to sounds, images, or stickers used to replace the original digital pictorial images, and to locations that are used for displaying different stickers with different sounds to different users at different geographical locations. The configuration module 124 stores mappings of the digital pictorial images to the media content, for example, sound files, images, etc., and the location of the sender device 101 in the database 125.

The API management module 122, the asset management module 123, and the configuration module 124 of the server application 110b are disclosed above as software executed by the processor 117. In an embodiment, the modules, for example, 122, 123, and 124 of the expression enhancing engine 110 are implemented completely in hardware. In another embodiment, the modules, for example, 122, 123, and 124 of the expression enhancing engine 110 are implemented by logic circuits to carry out their respective functions disclosed above. The processor 117 retrieves and executes instructions defined by the API management module 122, the asset management module 123, and the configuration module 124 from the memory unit 121 for performing respective functions disclosed above. In an embodiment, the expression enhancing engine 110 is implemented as a combination of hardware and software including one or more processors, for example, 102 and 117, that are used to implement the modules, for example, 111, 112, 113, 122, 123, and 124 of the expression enhancing engine 110.

In the system 100 disclosed herein, the client application 110a on the sender device 101 interfaces with the server application 110b on the expression enhancing server 127, and therefore more than one specifically programmed computing system is used for implementing the enhancement of an expression of a digital pictorial image. The processing time involved in enhancing an expression of a digital pictorial image varies depending on the computing power of the sender device 101 and/or the expression enhancing server 127.

For purposes of illustration, the detailed description refers to the expression enhancing engine 110 being run on a client-server system; however the scope of the system 100 and the method disclosed herein is not limited to the expression enhancing engine 110 being run on a client-server system, but may be extended to being run locally on a single computer system, for example, the sender device 101 via the operating system and the processor 102 or remotely over the network 130 by employing a web browser and a remote server, a mobile phone, or other electronic devices. In an embodiment, one or more portions of the system 100 disclosed herein are distributed across one or more computer systems (not shown) coupled to the network 130.

A module, or an engine, or a unit, as used herein, refers to any combination of hardware, software, and/or firmware. As an example, a module, or an engine, or a unit may include hardware, such as a microcontroller, associated with a non-transitory, computer-readable storage medium to store computer program codes adapted to be executed by the microcontroller. Therefore, references to a module, or an engine, or a unit, in an embodiment, refer to the hardware that is specifically configured to recognize and/or execute the computer program codes to be held on a non-transitory, computer-readable storage medium. The computer program codes comprising computer readable and executable instructions can be implemented in any programming language. In an embodiment, the computer program codes or software programs are stored on or in one or more mediums as object code. In another embodiment, the term "module" or "engine" or "unit" refers to the combination of the microcontroller and the non-transitory, computer-readable storage medium. Often module or engine or unit boundaries that are illustrated as separate commonly vary and potentially overlap. For example, a module or an engine or a unit may share hardware, software, firmware, or a combination thereof, while potentially retaining some independent hardware, software, or firmware. In various embodiments, a module or an engine or a unit includes any suitable logic.

Figure 2:
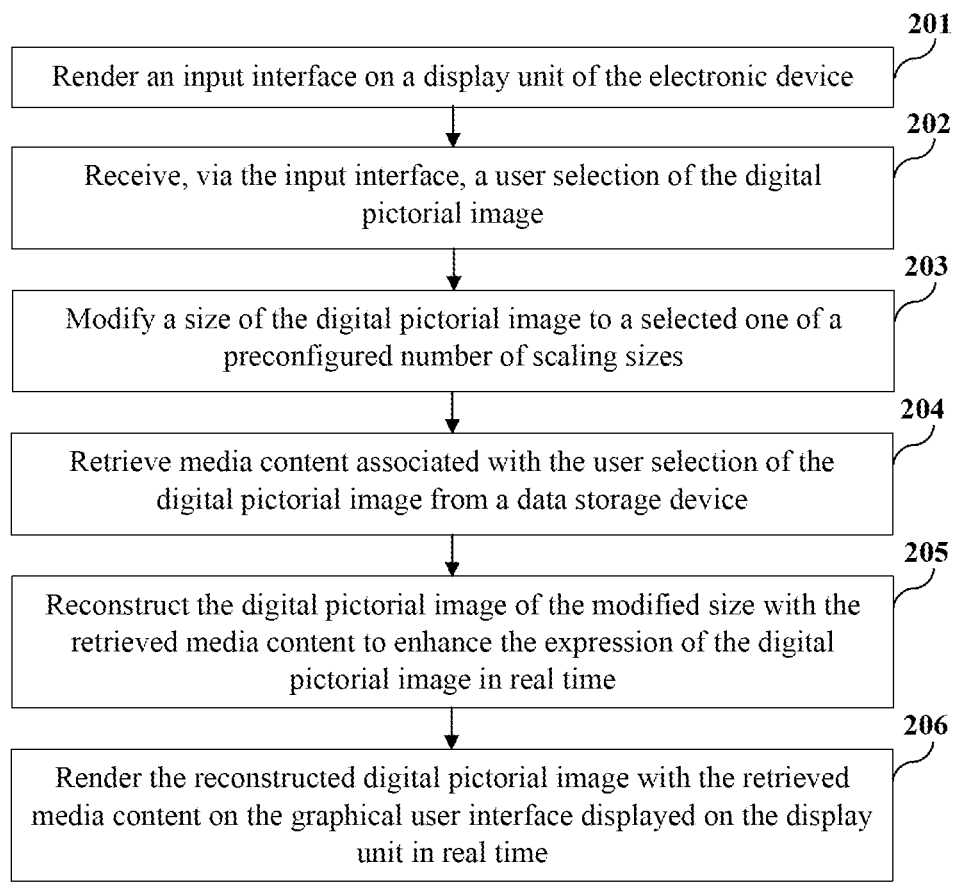
FIG. 2 illustrates a flowchart of a method for enhancing an expression of a digital pictorial image on a graphical user interface of an electronic device, according to an embodiment of the present invention.

FIG. 2 illustrates a flowchart of a method for enhancing an expression of a digital pictorial image on a graphical user interface (GUI) of an electronic device, according to an embodiment of the present invention. In an embodiment, the expression enhancing engine of the system employs a computer-implemented method for enhancing an expression of a digital pictorial image on the GUI of the electronic device. In the computer-implemented method disclosed herein, the expression enhancing engine deployed on the electronic device renders 201 an input interface, for example, a touch-enabled keyboard interface, an image selection input interface, or any other input interface, on a display unit of the electronic device for facilitating selection of a digital pictorial image by a user. The input interface displays multiple digital pictorial images, for example, emojis, product images, etc., in different formats for selection by a user. When a user performs an input action, for example, a long press action on a desired digital pictorial image via the input interface, the expression enhancing engine, in communication with the sensing unit of the electronic device, receives 202 the user selection of the digital pictorial image. The expression enhancing engine modifies 203 a size of the digital pictorial image to a selected one of a preconfigured number of scaling sizes. The expression enhancing engine retrieves 204 media content, for example, image content such as an animation, audio content such as sound effects, etc., associated with the user selection of the digital pictorial image from a data storage device.

The expression enhancing engine reconstructs 205 the digital pictorial image of the modified size with the retrieved media content to enhance the expression of the digital pictorial image in real time. In the process of reconstruction of the digital pictorial image, the expression enhancing engine maps a unicode corresponding to the digital pictorial image to a digital replacement image. The expression enhancing engine, in communication with the media playback device of the electronic device, renders 206 the reconstructed digital pictorial image with the retrieved media content on the GUI displayed on the display unit in real time. The expression enhancing engine, in communication with the media playback device, for example, audio speakers, plays back the audio content during the rendering of the reconstructed digital pictorial image on the GUI in real time. In an embodiment, the expression enhancing engine renders the reconstructed digital pictorial image with the retrieved media content on a sender device that sends the reconstructed digital pictorial image and/or on a recipient device that receives the reconstructed digital pictorial image. In another embodiment, the expression enhancing engine renders the digital pictorial image of the modified size free of the retrieved media content on the GUI displayed on the display unit in real time.

In the exemplary implementation of the system disclosed in the detailed description of FIG. 1, the memory units of the client-server system store computer program instructions executable by respective processors for enhancing an expression of a digital pictorial image on the GUI of the electronic device. The computer program instructions implement the processes of various embodiments disclosed above and perform additional steps that may be required and contemplated for enhancing an expression of a digital pictorial image on the GUI of the electronic device. When the computer program instructions are executed by the respective processors, the computer program instructions cause the respective processors to perform the steps of the method for enhancing an expression of a digital pictorial image on the GUI of the electronic device as disclosed above. In an embodiment, a single piece of computer program code comprising computer program instructions performs one or more steps of the method disclosed above.

FIGS. 3A-3B illustrate a flowchart of a method for enhancing an expression of an emoji on a graphical user interface (GUI) of an electronic device, for example, a smartphone, according to an embodiment of the present invention. Consider an example where a user invokes a user application, for example, a messaging application, on the smartphone. In an embodiment, the user launches the expression enhancing engine configured as an application (app) via the user application. For example, a user may click on an application icon from a device app launcher installed on the smartphone to launch 301 the expression enhancing engine. In an embodiment, the expression enhancing engine is launched separate from launching an input interface, for example, a touch-based keyboard interface, on the electronic device. In an embodiment, the expression enhancing engine is launched through various actions on the input interface. In an exemplarily implementation of the system disclosed herein, the expression enhancing engine comprises a client application deployed on the smartphone in operable communication with an expression enhancing server, herein referred to as a "server", via a network.

When the expression enhancing engine is launched on the smartphone, the client application calls 302 one or more application programming interfaces (APIs) associated with the expression enhancing engine (EEE), herein referred to as the EEE API from the server. The client application also makes configuration (config) calls 302 to the server to retrieve user related data for operating the client application on the user's smartphone. In an embodiment, during a config call to the server, the client application, in communication with the global positioning system (GPS) component of the electronic device, sends the location of the smartphone to the server. If the server receives the location of the smartphone, the server filters the emoji mappings to be sent to the client application based on the location of the smartphone. If the server does not receive the location of the smartphone, the server utilizes an internet protocol (IP) address to detect a location of the smartphone and filters the emoji mappings based on this location. During the config call, the client application inputs an identifier of the user and/or the user's smartphone and the user's coarse location. During processing, the server determines whether location is present in the config call received from the client application. If the location is present in the config call, the server determines a state and a country from the location. If the location is not present in the config call, the server determines the state and the country from the IP address. If media content, for example, digital replacement images and sound files for the emojis is present for a determined location, state, and country, the server returns the media content for the emojis to the client application. If the media content is not present for a determined location, state, and country, the server returns default media content for the emojis to the client application.

In an embodiment, the data retrieved from the server is, for example, in a JavaScript Object Notation (JSON) format that stores data objects comprising attribute-value pairs and array data types or serializable values. These data objects comprise multiple values used for changing the behaviour of the expression enhancing engine. Few examples of the values stored by the server in the JSON format comprise #maxEmojiWidth, #minEmojiWidth, #noOfPhases, and #killSwitch, where #maxEmojiWidth refers to a maximum size of the bitmap(emoji) in display pixels (dp); #minEmojiWidth refers to a minimum size of the bitmap(emoji) in dp; #noOfPhases refers to the preconfigured number of scaling sizes provided by the expression enhancing engine for rendering an emoji as a digital sticker; #killSwitch refers to a disable option for disabling the expression enhancing engine from the input interface, and #imageUrls refers to an emoji representing a sticker. Further, #imageUrls includes two kinds of URLs, namely #URL which refers to a sticker that is being shared on the input interface and #Webp URL which refers to an animated emoji that is being shared on the input interface.

After the config calls, the client application makes an API call to fetch data related to enhancing the expression of the emojis. In an embodiment, this data comprising, for example, pairs pertaining to the emojis, is stored in the JSON format on the server. The pairs comprise, for example, uniform resource locators (URLs) mapped to media content, for example, sound files and assets such as replaceable stickers for the emojis and watermarks for the stickers. The client application receives an API response to the API call and stores the fetched data from the API response in a data store of the smartphone. In an embodiment, the client application utilizes, for example, a relational database management system contained in a C library or another method for storing and retrieving small amounts of data, for example, key/value pairs in the data store. After fetching the pairs comprising the URLs mapped to the media content, the client application downloads the data for local usage in the data store of the smartphone.

After fetching the data comprising the mapped URLs from the server, the client application compares 303 the mapped URLs received from the server with related data stored in an internal repository previously stored in the data store of the smartphone. The client application creates the internal repository of the related data comprising, for example, emojis and their linked sound files or replaceable sticker images. In an embodiment, the client application stores the emojis and their related data as static components in the form of hashmaps or key-value pairs in the internal repository. The internal repository is accessible throughout the user application. If the mapped URLs are the same, the client application makes no change 304 to the data in the internal repository. If the mapped URLs are different from the URLs stored in the internal repository, that is, if the URLs have been changed or new emojis have been added at the server and are not available in the internal repository or hashmaps of the data in the data store, the client application downloads 305 the data or resources and updates the internal repository by storing 306 the local paths of the data in the internal repository. The stored data is indexed in the internal repository for convenient identification.

When the user performs an input action 307, for example, by touching a text field on the GUI displayed on the display unit of the smartphone, the client application renders the input interface of the expression enhancing engine on the GUI to allow the user to input a text message or an emoji into the text field. In an embodiment, on rendering the input interface, the client application checks 308 whether the EEE API was called within or greater than a preconfigured time period or a fixed interval of time, for example, in the past 24 hours. The server application of the expression enhancing engine configures the time period via a config API. If the EEE API was called at a time greater than the preconfigured time period, for example, 24 hours, the client application calls 302 the EEE API in a background thread that does not affect the currently operating input interface and proceeds with the steps 303 to 306 disclosed above. If the EEE API was called within the preconfigured time period, the client application continues with the parallel process comprising steps 309-329 as disclosed below.

At step 309, the client application checks whether the currently running user application and its input view support sharing of media content, for example, stickers, images in a graphics interchange format (gif), etc. If the currently running user application and its input view do not support sharing of media content, the client application allows the user to send an emoji through a normal operation 312, for example, by typing the emoji in an input text field of the user application. The client application renders an emoji/number row view on the input interface to allow the user to send emojis directly from the input interface without having to navigate to complete emoji grids. In an embodiment, on receiving a single press action on a selected emoji from the user, the client application sends the emoji to the text field. In another embodiment, on receiving a long press action 310 on the selected emoji, the client application initiates the expression enhancement process executed by the expression enhancing engine. The user may invoke the expression enhancement process through the emoji/number row view on the input interface or through the emoji grid that displays all the emojis. The client application then checks 311 whether the expression enhancing process is enabled. If the expression enhancing process is not enabled, the client application allows the user to send an emoji through a normal operation 312 without enhancement of the expression of the emoji. In this case, a long press action operates as a single click on the emoji and causes the emoji to be rendered on the GUI of the user application. If the expression enhancing process is enabled, the client application executes a parallel process starting with steps 313 and 316. At step 313, for the selected emoji, the client application checks whether there is an enhancement sound in the related data stored in the internal repository. If there is an enhancement sound in the related data for the selected emoji, the client application plays 314 the enhancement sound, for example, through an audio speaker of the smartphone. In an embodiment, the client application plays the enhancement sound as the emoji is being scaled to a larger size in a popup window. If there is no enhancement sound in the related data for the selected emoji, that is, in a pointed location from the hashmap, the client application plays 315 a default sound, for example, through the audio speaker of the smartphone. The client application downloads the default sound through the internal repository. If the default sound is not locally available in the internal repository, the client application plays a default sound embedded in a raw folder of the user application or smartphone application that has been bundled during generation of a package file format, for example, the Android package (APK).

Parallel to checking for an enhancement sound, the client application initiates 316 scaling of the selected emoji for a preconfigured number of scaling sizes in the popup window. For example, the client application initiates scaling of the selected emoji for three scaling sizes, also referred to as "three phases", in the popup window. In an embodiment, the client application creates a transparent background for the popup window and provides a text editor, for example, TextView inside the popup window. The client application scales and translates the selected emoji using operating system properties, for example, Android properties such as scaleX, scaleY, and translationY. The scaleX property resizes the selected emoji horizontally along the X-axis. The scaleY property resizes the selected emoji up or down in a vertical direction along the Y-axis. The client application combines scaleX and scaleY properties to enlarge the selected emoji inside the TextView, while the translationY property animates the selected emoji to rise. The client application performs whole scaling and translation within a time frame that is configurable by the server for each phase of the enhancement or animation. In an embodiment, the client application performs the enhancement or animation of the selected emoji using a translationX property along with an animating property, which allows animation of the selected emoji according to a predefined number of values. For example, the translationX property along with an animating property generates a shaking movement of the selected emoji in the popup window. The client application combines the scaling and translation functions disclosed above and plays them alongside each other in a preconfigured order.

At step 317, the client application waits for the user to select a scaling size or phase for the selected emoji by completing the input action at the third phase or by completing the input action at any desired phase or waits for the user to cancel the input action and operation, for example, by swiping away from the input or touch point. If the user cancels the input action, the client application immediately closes 318 the popup window and terminates the playback of any sound. The client application, in communication with the sensing unit of the smartphone, detects the cancellation by constantly detecting movement of a touch event, for example, by detecting movement of the user's finger, touch of the user's finger on another location of the input interface or GUI, or lifting up of the user's finger. If the user swipes the finger to any of the directions on the input interface away from the TextView of the selected emoji, the client application cancels the operation.

If the user selects a scaling size or a phase for the selected emoji, the client application executes a parallel process starting with steps 319 and 322. At step 319, the client application checks whether there is a "send" sound for the selected emoji in the data stored in the internal repository. If there is a "send" sound for the selected emoji in the stored data, the client application plays 320 the corresponding "send" sound through the audio speakers of the smartphone, after terminating payback of the enhancement sound. If there is no "send" sound for the selected emoji in the stored data, the client application plays 321 a default sound through the audio speakers of the smartphone. Parallel to step 319, at step 322, the client application creates a canvas based on the scaling size or the phase selected by the user. In an embodiment, the client application determines the size of the canvas using factors, for example, #minEmojiWidth(100), #maxEmojiWidth(512), and currentPhase/phase at which the user lifts the finger from the input interface. For example, when there are three scaling sizes or phases for a selected emoji, if the user lifts the finger at the second phase, the client application calculates the size of the canvas using the example formula below:

$$size=minEmojiWidth+(maxEmojiWidth-minEmojiWidth)/maxPhase*(currentPhase);$$

At step 323, the client application searches for a digital replacement image mapped to the selected emoji in the internal repository. In one embodiment, the client application searches for an animated emoji mapped to the selected emoji in the internal repository. Similar to storage of a sound file mapped to the selected emoji, the internal repository stores a separate hashmap for the digital replacement image. The digital replacement image is, for example, a digital image of a themed emoji for an occasion, a situation, or a festival. For example, a digital pictorial image of a laughing emoji is mapped to a digital replacement image of a laughing emoji wearing a mask. If the client application finds the digital replacement image for the selected emoji in the internal repository, the client application fetches the digital replacement image from the internal repository, converts the fetched digital replacement image into a bitmap of the same size as that of the canvas created at step 322. The client application adds 324 the replacement image to the canvas as a bitmap. If the client application does not find the digital replacement image for the selected emoji in the internal repository, the client application adds 325 a text emoji to the canvas. The client application scales the text emoji to fill the size of the canvas and then converts the canvas into a bitmap. The client application then creates 326 a scaled bitmap for a digital sticker using the bitmap obtained from steps 324 and 325. The client application performs scaling based on the conditions of the user application. For example, chat applications allow stickers of a size, for example, 512×512. The client application scales the bitmap to the 512×512 size and maintains the aspect ratio.

The client application then checks 327 whether the user application supports direct sharing of the scaled images. User applications that support digital stickers typically allow direct sharing. If the user application on the user's smartphone does not support direct sharing, the client application converts the scaled bitmap obtained at step 326 to an image format, for example, at least one of a graphics interchange format (gif), portable network graphics (PNG) format, or web picture (Webp) according to the supported format of the user application and renders 328 the converted bite lap to the user application via the GUI. In one embodiment, on availability of the animated emoji, if the user application supports web pictures, the client application renders 329 the scaled bitmap as the animated emoji. If the user application on the user's smartphone supports direct sharing, the client application renders 329 the scaled bitmap as a sticker to the user application via the GUI.

Figure 4:
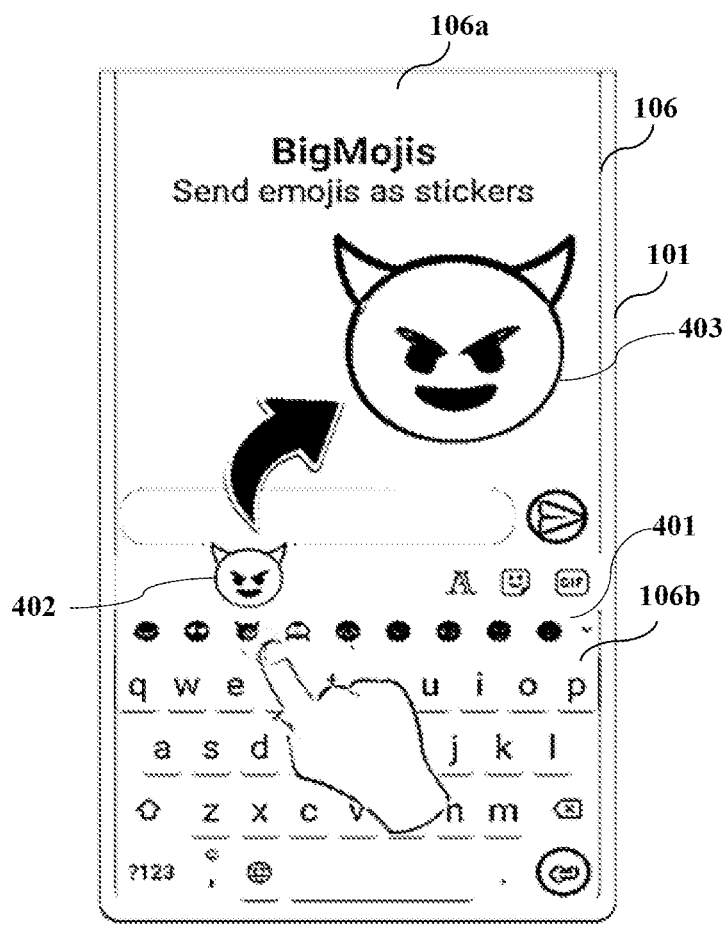
FIG. 4 illustrates a graphical user interface displayed on a display unit of an electronic device, showing a rendering of an enlarged digital pictorial image constructed by an expression enhancing engine, according to an embodiment of the present invention.

FIG. 4 illustrates a graphical user interface (GUI) 106a displayed on a display unit 106 of an electronic device 101, showing a rendering of an enlarged digital pictorial image 402 constructed by the expression enhancing engine, according to an embodiment of the present invention. Consider an example where a user invokes a user application, for example, a chat application, and launches the client application of the expression enhancing engine on the electronic device 101. The client application renders an input interface, for example, a touch-enabled keyboard interface 106b on the GUI 106a displayed on the display unit 106 of the electronic device 101. The touch-enabled keyboard interface 106b renders an emoji row 401 displaying multiple emojis for selection by the user. In an embodiment, the user selects a desired emoji from an emoji grid containing multiple emojis. For purposes of illustration, the detailed description exemplarily refers to the input interface being a touch-enabled keyboard interface 106b; however the scope of the system and the method disclosed herein is not limited to the input interface being a touch-enabled keyboard interface 106b, but may be extended to include any input interface, for example, a voice-enabled input interface, a gesture-enabled input interface, a camera-enabled input interface, an image selection input interface such as an emoji bar, etc., that displays a list of digital pictorial images for selection by a user, which triggers the functionality of enhancing an expression of a digital pictorial image on the GUI 106a of an electronic device 101 as disclosed in the detailed description of FIGS. 1-3B.

When the user selects a desired emoji, for example, a smiling face with horns, by performing a long press action on the desired emoji as illustrated in FIG. 4, the client application renders an emoji view interface or a popup window 402 comprising a text editor, for example, TextView, through which a unicode corresponding to the selected emoji is converted to a rendered emoji. The rendering of the output emoji depends on the platform of the expression enhancing engine.

The client application listens for a long press action on the desired emoji from the user. When the user performs the long press action on the desired emoji, the client application checks for animation and sound mapped to the selected emoji and plays them as disclosed in the detailed description of FIGS. 3A-3B. The client application copies the emoji text to the text editor of the newly created popup window 402 with a size, for example, equal to about half of the GUI 106a in terms of height and width. The client application displays the popup window 402 above the text editor from the emoji row 401. The client application performs scaling of the selected emoji for increasing the size of the selected emoji and animating the selected emoji as disclosed in the detailed description of FIGS. 3A-3B. The client application, in communication with media playback device of the electronic device 101, plays the sound file associated with the selected emoji during the step of animating the selected emoji.

The client application loads the sound files and plays the sound files that are mapped to emojis selected by the user in a static context. The client application uses the hashmap of the emoji-sound for comparing and retrieving a sound identity from a library, for example, in a soundpool instance. When the user releases his or her finger from a touch point of the emoji row 401, the client application checks for the current phase for the relative size of a sticker or an image supported by the chat application. If the user cancels the enhancement of the selected emoji, the client application detects the cancellation operation, closes the popup window 402, and terminates playback of the sound file as disclosed in the detailed description of FIGS. 3A-3B. If the client application does not detect a cancellation operation, the client application creates a bitmap comprising text or an image of that relative size from the current phase. The client application calculates the size of the bitmap as disclosed in the detailed description of FIGS. 3A-3B. The client application uses the resulting bitmap to create a scaled bitmap with a maintained aspect ratio. The size of this newly created bitmap is, for example, 512×512 for sharing as a sticker. The client application converts the bitmap, for example, to a portable network graphics (PNG) format 403 for instant sharing to the running chat application.

Figure 5A:
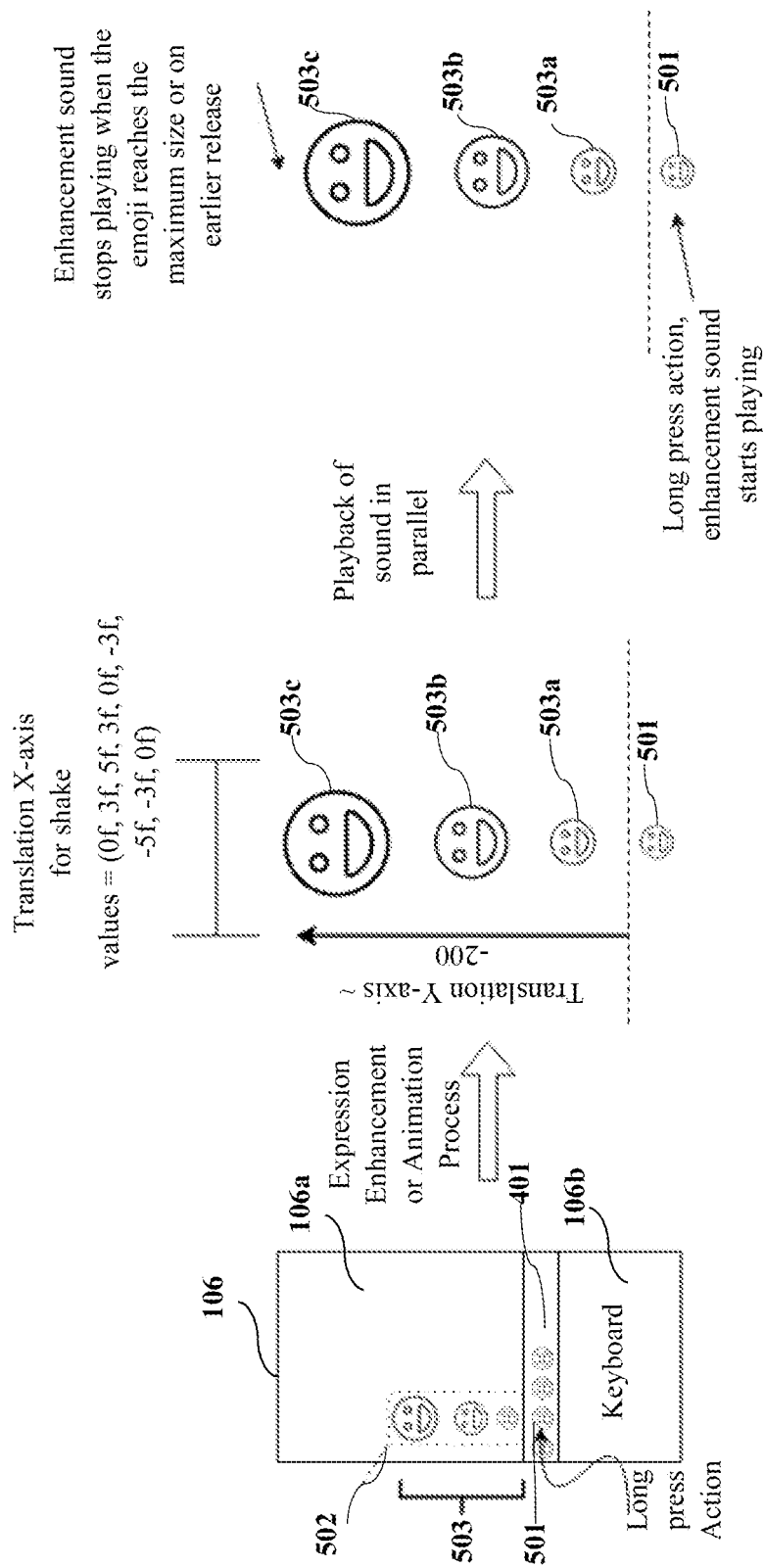
FIGS. 5A-5B illustrate schematics showing conversion of a digital pictorial image into a digital sticker, according to an embodiment of the present invention.
Figure 5B:
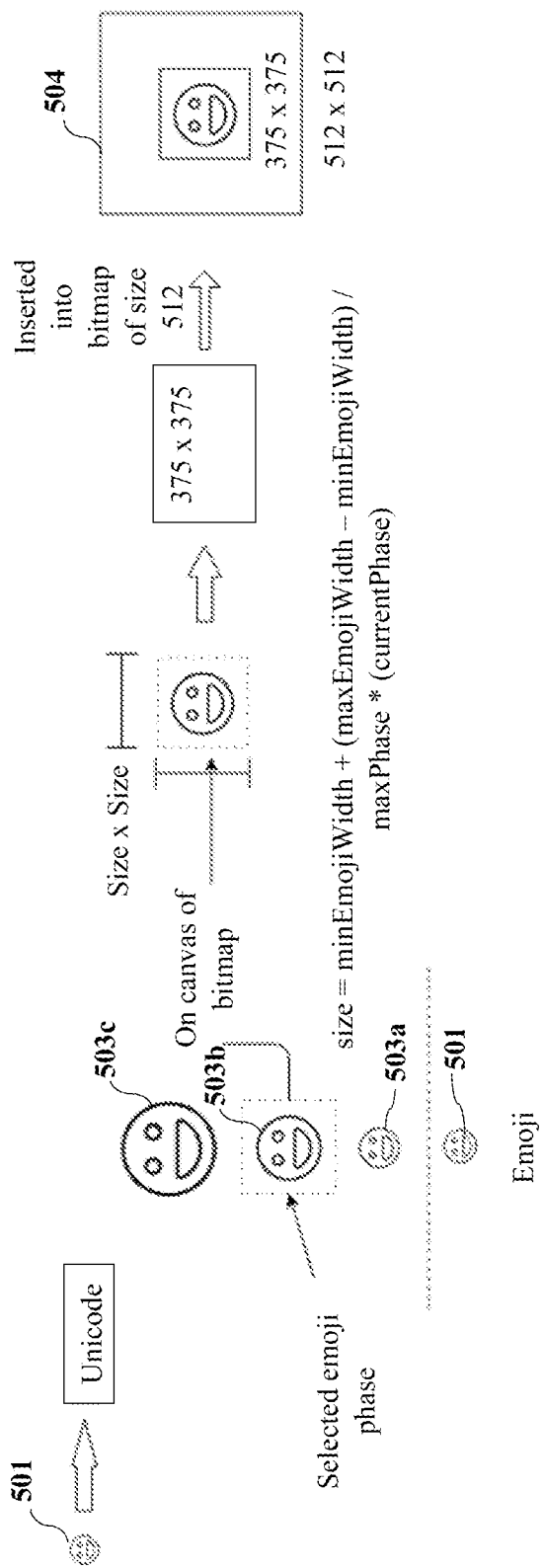

FIGS. 5A-5B illustrate schematics showing conversion of a digital pictorial image, for example, an emoji 501, into a digital sticker 504, according to an embodiment of the present invention. When the user launches the client application of the expression enhancing engine on the electronic device, the client application renders an input interface, for example, a touch-enabled keyboard interface 106b on the graphical user interface (GUI) 106a displayed on the display unit 106 of the electronic device. The touch-enabled keyboard interface 106b renders an emoji row 401 displaying multiple emojis for selection by the user as disclosed in the detailed description of FIG. 4.

When the user selects a desired emoji 501, for example, a smiley, by performing a long press action on the desired emoji 501, the client application renders a transparent popup window 502 above the emoji row 401 on the GUI 106a as illustrated in FIG. 5A, through which a unicode corresponding to the selected emoji 501 is converted to a rendered emoji. The client application modifies the size of the selected emoji 501, for example, by scaling the selected emoji 501 for three phases 503 in the popup window 502. The client application combines scaleX and scaleY properties to enlarge the selected emoji 501 to three phases 503a, 503b, and 503c inside the popup window 502, while the translationY property animates the selected emoji 501 to rise. The first phase 503a of the selected emoji 501 is, for example, two times the size of the selected emoji 501. The second phase 503b of the selected emoji 501 is, for example, three times the size of the selected emoji 501. The third phase 503c of the selected emoji 501 is, for example, four times the size of the selected emoji 501.

The client application, in communication with media playback device of the electronic device, plays the sound file associated with the selected emoji 501 during the step of animating the selected emoji 501. When the user releases his or her finger from a touch point of the emoji row 401, the client application checks for the current phase for the relative size of a sticker or an image supported by the chat application. If the user cancels the enhancement of the selected emoji 501, the client application detects the cancellation operation, closes the popup window 502, and terminates playback of the sound file as disclosed in the detailed description of FIGS. 3A-3B. If the client application does not detect a cancellation operation, but detects a release of the user's finger at the second phase 503b, the client application creates a bitmap comprising text or an image, of that relative size from the second phase 503b as illustrated in FIG. 5B. The client application calculates the size of the bitmap as disclosed in the detailed description of FIGS.

3A-3B. The client application uses the resulting bitmap to create a scaled bitmap with a maintained aspect ratio. The size of this newly created bitmap is, for example, 512×512 for sharing as a sticker 504.

FIG. 6A illustrates an exemplary database schema implemented by the system for enhancing an expression of a digital pictorial image on a graphical user interface of an electronic device, according to an embodiment of the present invention. A server-side database schema is illustrated in FIG. 6A. The database 125 of the expression enhancing server 127 illustrated in FIG. 1 is any storage area or medium that can be used for storing data and files. The database 125 can be, for example, any of a structured query language (SQL) data store or a not only SQL (NoSQL) data store such as the Microsoft® SQL Server®, the Oracle® servers, the MySQL® database of MySQL AB Limited Company, the mongoDB® of MongoDB, Inc., the Neo4j graph database of Neo Technology Corporation, the Cassandra database of the Apache Software Foundation, the HBase® database of the Apache Software Foundation, etc. In an embodiment, the database 125 is a location on a file system. In another embodiment, the database 125 is remotely accessed by the client application 110*a* of the expression enhancing engine 110 illustrated in FIG. 1, via a network 130. In another embodiment, the database 125 is configured as a cloud-based database implemented in a cloud computing environment, where computing resources are delivered as a service over the network 130.

FIG. 6B illustrates exemplary data stored in the database 125 of the system for enhancing an expression of a digital pictorial image on a graphical user interface of an electronic device, according to an embodiment of the present invention. The database 125 stores an identifier of each emoji, the emoji itself, an image file corresponding to the emoji, and sound files mapped to the emoji as illustrated in FIG. 6B.

FIG. 7 illustrates a mapping interface 701 generated by the expression enhancing engine for enhancing an expression of a digital pictorial image on a graphical user interface of an electronic device, according to an embodiment of the present invention. On the client side, the client application stores data related to the digital pictorial images, for example, in a JavaScript Object Notation (JSON) format in the data store of the electronic device. The client application stores the JSON data, for example, as strings using a data storage option provided by a platform, for example, the Android platform, of the electronic device. The client application converts the JSON data into a JSON object. A tabular format of the JSON data is illustrated in the mapping interface 701 shown in FIG. 7. The mapping interface 701 displays the sound files and digital replacement images mapped to corresponding emojis. The client application stores the data illustrated in FIG. 7 as a static reference using hashmaps comprising key-value pairs in the data store and uses the data during runtime.

Figure 8B:
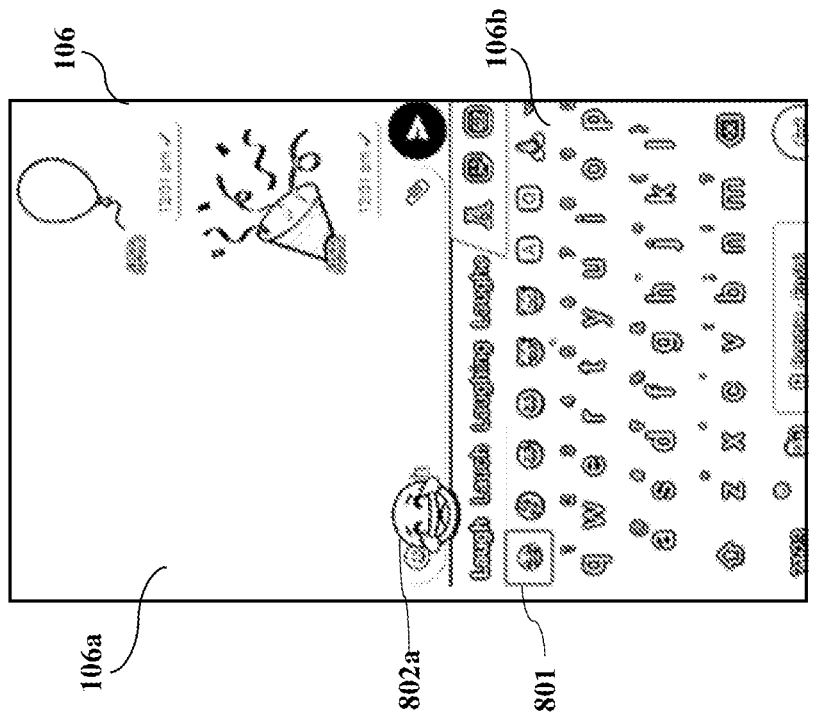
FIGS. 8A-8D illustrate screenshots of graphical user interfaces, showing an enhancement of an expression of a digital pictorial image, according to an embodiment of the present invention.
Figure 8A:
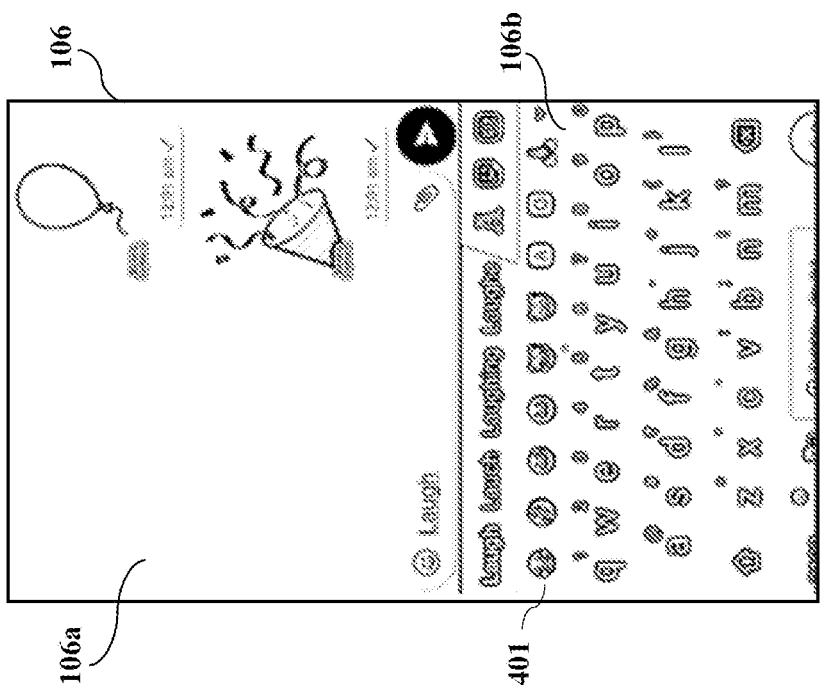
Figure 8D:
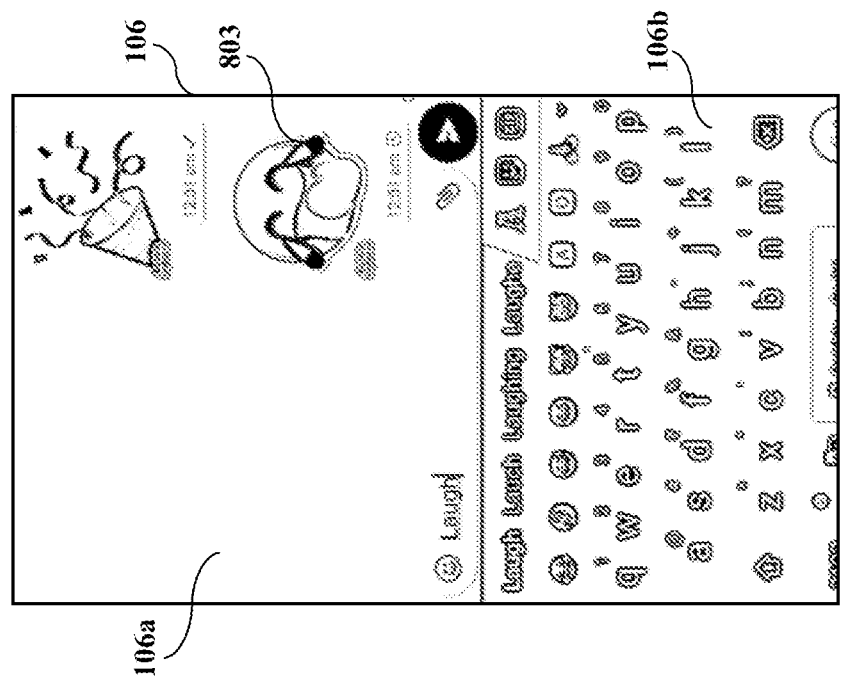
Figure 8C:
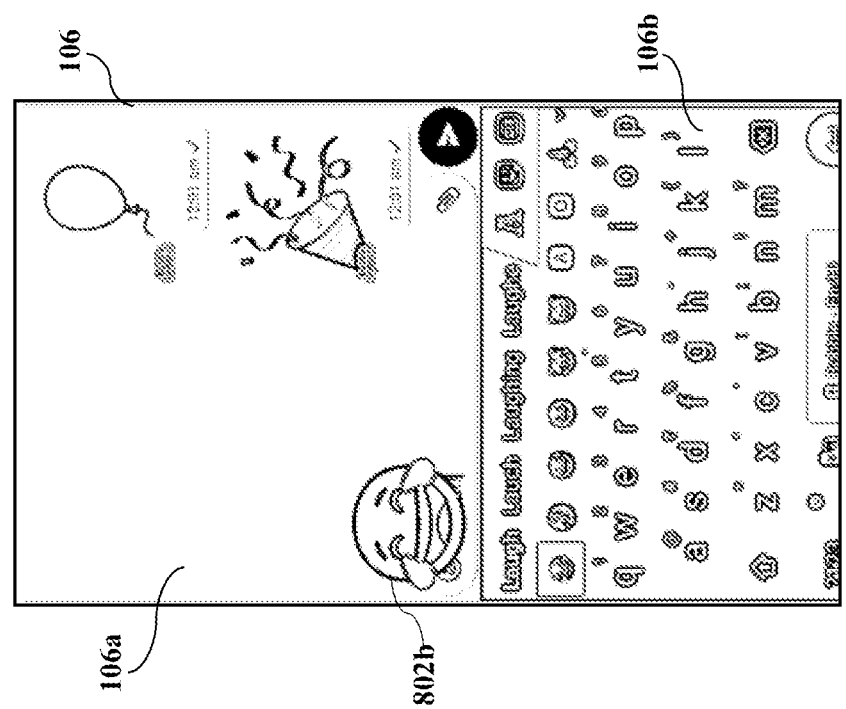

FIGS. 8A-8D illustrate screenshots of graphical user interfaces (GUIs) 106*a*, showing an enhancement of an expression of a digital pictorial image, according to an embodiment of the present invention. Consider an example where a user invokes a user application, for example, a chat application, and launches the client application of the expression enhancing engine on the electronic device. The client application renders an input interface, for example, a touch-enabled keyboard interface 106*b* on the GUI 106*a* displayed on the display unit 106 of the electronic device. The touch-enabled keyboard interface 106*b* renders an emoji row 401 displaying multiple emojis for selection by the user. When the user selects a desired emoji 801 by performing a long press action on the desired emoji 801, the client application scales the selected emoji 801, for example, to three phases starting from a first phase 802*a* in a transparent popup window as illustrated in FIG. 8B. If the user releases his or her finger from the selected emoji 801 when the selected emoji 801 is in the second phase 802*b* as illustrated in FIG. 8C, the client application renders the digital replacement image 803 of the modified size on the GUI 106*a* as illustrated in FIG. 8D while playing back the media content, for example, audio content mapped to the selected emoji 801 through the media playback device of the electronic device.

Figure 9B:
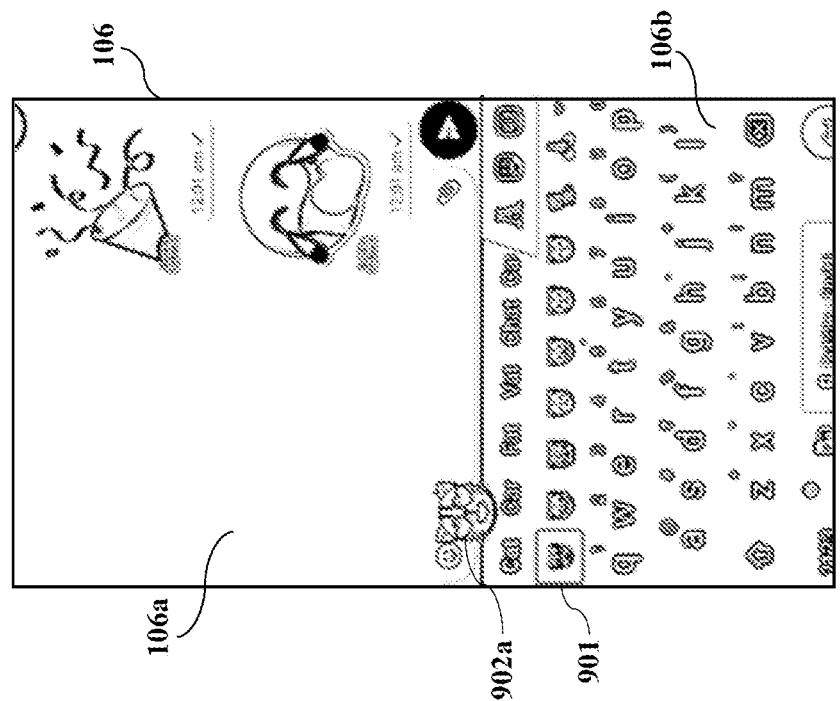
FIGS. 9A-9D illustrate screenshots of graphical user interfaces, showing a rendering of an enlarged digital pictorial image, according to an embodiment of the present invention.
Figure 9A:
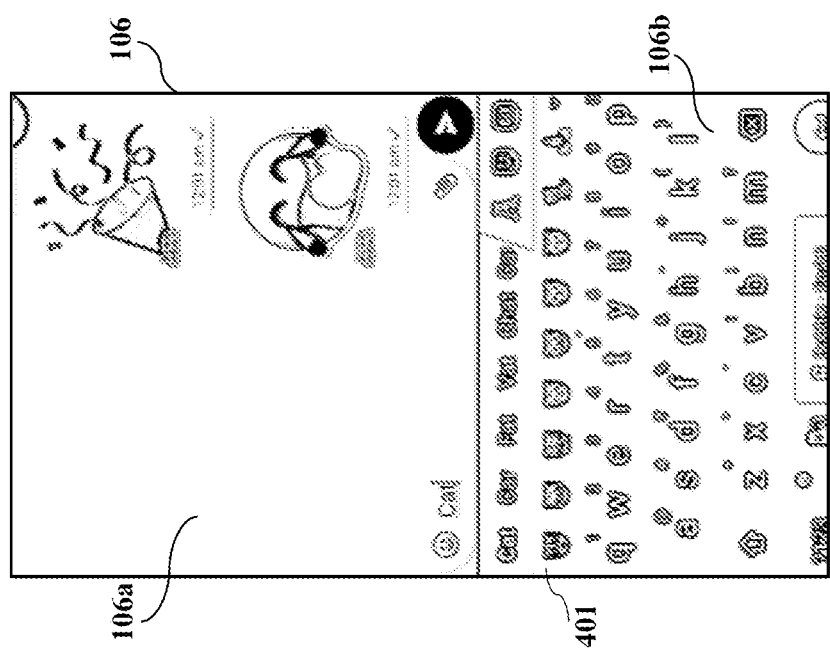
Figure 9D:
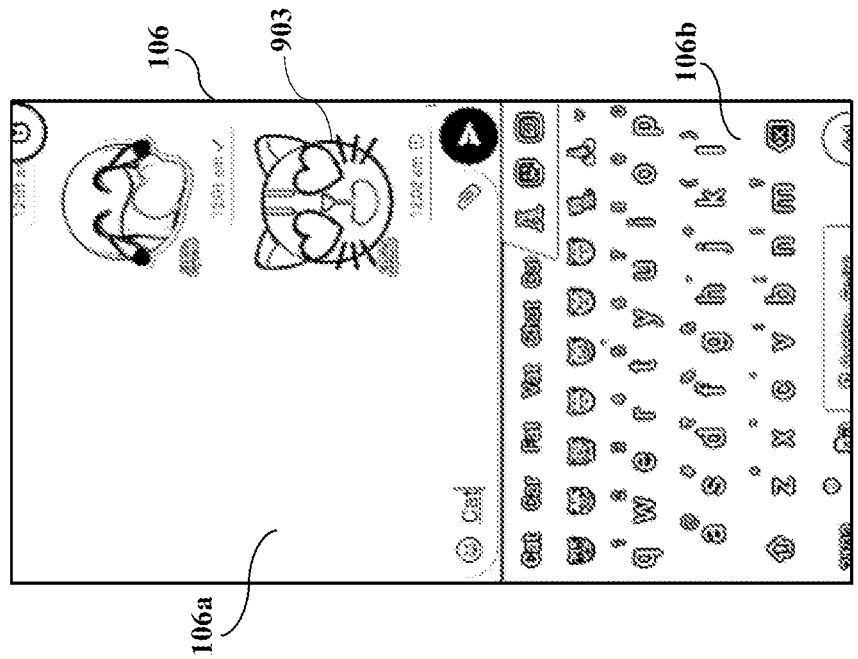
Figure 9C:
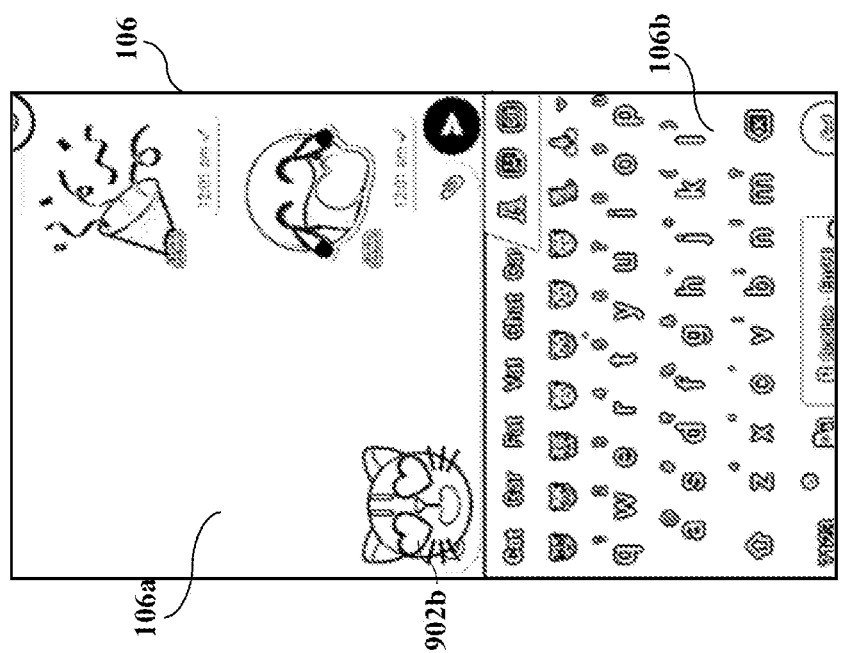

FIGS. 9A-9D illustrate screenshots of graphical user interfaces (GUIs) 106*a*, showing a rendering of an enlarged digital pictorial image 903, according to an embodiment of the present invention. In this embodiment, the expression enhancing engine modifies or increases the size of a selected digital pictorial image and renders the enlarged digital pictorial image 903 of the increased size without animation on the GUI 106*a* displayed on the display unit 106 of the electronic device. Consider an example where a user invokes a user application, for example, a chat application, and launches the client application of the expression enhancing engine on the electronic device. The client application renders an input interface, for example, a touch-enabled keyboard interface 106*b* on the GUI 106*a* displayed on the display unit 106 of the electronic device. The touch-enabled keyboard interface 106*b* renders an emoji row 401 displaying multiple emojis for selection by the user. When the user selects a desired emoji 901 by performing a long press action on the desired emoji 901, the client application scales the selected emoji 901, for example, to three phases starting from a first phase 902*a* in a transparent popup window as illustrated in FIG. 9B. If the user releases his or her finger from the selected emoji 901 when the selected emoji 901 is in the second phase 902*b* as illustrated in FIG. 9C, the client application renders the enlarged emoji 903 in the second phase 902*b* without replacement of the selected emoji 901 on the GUI 106*a* as illustrated in FIG. 9D, while playing back the media content, for example, audio content mapped to the selected emoji 901 through the media playback device of the electronic device.

Figure 10A:
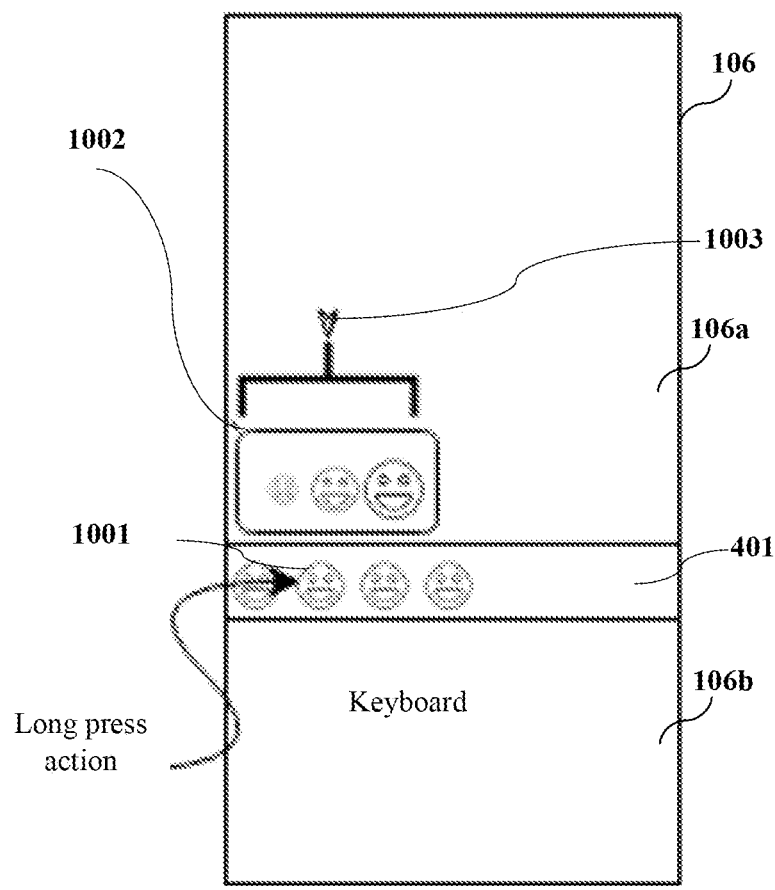
FIGS. 10A-10B illustrate screenshots showing different options for selecting sizes of a digital pictorial image to be rendered on a graphical user interface displayed on a display unit of an electronic device, according to an embodiment of the present invention.
Figure 10B:
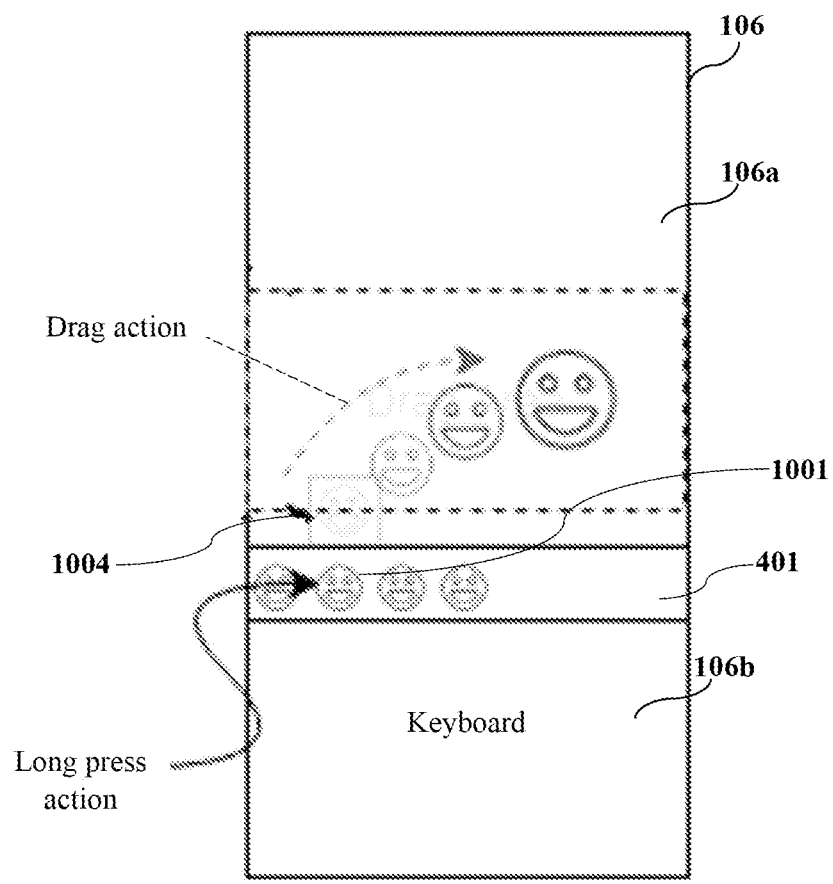

FIGS. 10A-10B illustrate screenshots showing different options for selecting sizes of a digital pictorial image, for example, an emoji 1001, to be rendered on a graphical user interface (GUI) 106*a* displayed on a display unit 106 of an electronic device, according to an embodiment of the present invention. Consider an example where a user invokes a user application, for example, a chat application and launches the client application of the expression enhancing engine on the electronic device. The client application renders an input interface, for example, a touch-enabled keyboard interface 106*b* on the GUI 106*a* displayed on the display unit 106 of the electronic device. The touch-enabled keyboard interface 106*b* renders an emoji row 401 displaying multiple emojis for selection by the user. FIG. 10A illustrates a single popup window 1002 displaying the emoji 1001 of different scaling sizes or phases 1003 therewithin. In the embodiment illustrated in FIG. 10A, when the user performs a long press action on a desired emoji 1001 displayed in the emoji row 401, the client application renders the popup window 1002 comprising three phases 1003 of that emoji 1001. The user may then select any phase of the emoji 1001 by clicking on the phase or cancel the operation by clicking on another location outside the popup window 1002.

FIG. 10B illustrates a drag and drop option provided by the client application. The drag and drop option allows the user to drag the desired emoji 1001 into the graphical user interface (GUI) 106*a*. In this embodiment, the desired emoji 1001 is of a single size and the size of the desired emoji 1001 is not scaled. In the embodiment illustrated in FIG. 10B, when the user performs a long press action on a desired emoji 1001 displayed in the emoji row 401, the user may drag the desired emoji 1001 to a visible area 1004 of the GUI 106*a* or to an area highlighted above the touch-enabled keyboard interface 106*b*.

Figure 11:
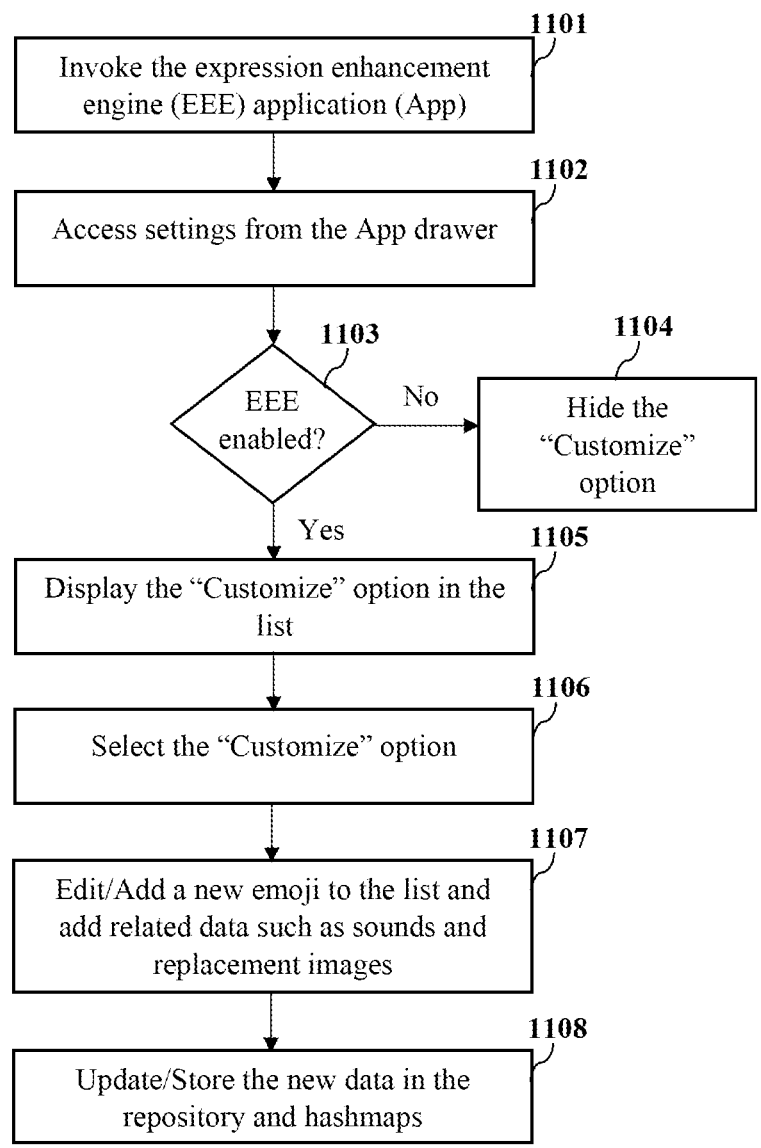
FIG. 11 illustrates a flowchart of a method for customizing a digital pictorial image based on user preferences, according to an embodiment of the present invention.

FIG. 11 illustrates a flowchart of a method for customizing a digital pictorial image based on user preferences, according to an embodiment of the present invention. In this embodiment, the user may create their own sound files and images for enhancing the expression of digital pictorial images, for example, emojis. In the method disclosed herein, the user invokes 1101 the client application of the expression enhancing engine on an electronic device and accesses 1102 settings from an app drawer in the electronic device. The client application determines 1103 whether the expression enhancing engine is enabled on the electronic device. If the expression enhancing engine is not enabled on the electronic device, the client application hides 1104 the "Customize" option. If the expression enhancing engine is enabled on the electronic device, the client application displays 1105 the "Customize" option in a display list. The user selects 1106 the "Customize" option to edit or add 1107 a new emoji to a list of emojis and to store related data, for example, sounds, replacement images, etc., to the data store of the electronic device. The client application updates 1108 the internal repository and hashmaps and stores the newly added data in the internal repository and hashmaps.

FIGS. 12A-12B illustrate screenshots of a customization interface 1202 rendered by the expression enhancing engine for customizing a digital pictorial image based on user preferences, according to an embodiment of the present invention. FIG. 12A illustrates the "Customize" option 1201 displayed in the display list as disclosed in the detailed description of FIG. 11. On clicking the "Customize" option 1201, the client application renders the customization interface 1202 illustrated in FIG. 12B, to allow the user to edit or add a new emoji to a list of emojis and to store related data, for example, sounds, replacement images, etc., to the data store of the electronic device.

The system and the method for enhancing an expression of a digital pictorial image on a graphical user interface (GUI) of an electronic device as disclosed above improve user interactions and meet interactive demands of device-based conversations such as smartphone conversations between users. Moreover, the system and the method disclosed herein provide quick input methods for sharing an enlarged, interactive digital pictorial image with media content, for example, animation, sound effects, etc., through a user application in real time. Furthermore, the system and the method disclosed herein provide interactive user interfaces that allow users to select the sizes of digital pictorial images, for example, emojis, for conversion into digital stickers and share the digital pictorial images with enhanced expressions as digital stickers. The system and the method disclosed herein provide input methods to introduce custom stickers mapped with regular digital pictorial images. Furthermore, the system and the method disclosed herein allow enlarging of digital pictorial images via the input interface with or without media content, for example, sound effects, animations etc. Instead of having to download images from the internet for use in a user application, for example, a chat application, the expression enhancing engine allows the user to send an enlarged digital pictorial image with animation and sound effects that complement the animation through the user application in real time by merely performing a long press action over the desired digital pictorial image. The expression enhancing engine utilizes hashmaps in a static context. The hashmaps created by the expression enhancing engine are similar to that of a keyboard running in the background, thereby enabling a faster association of clicked emojis and assets, for example, sounds and replacement images, related to the emojis. In the system and the method disclosed herein, the media content comprising, for example, sound files, replacement images, watermarks, etc., and emoji maps are server configurable and hence are independent of updation of the client application through an application store. Furthermore, the expression enhancing engine is configured to enhance the above-mentioned assets with brand requirements, thereby allowing users to serve as brand ambassadors by sharing the branded digital pictorial images.

It is apparent in different embodiments that the various methods, algorithms, and computer-readable programs disclosed herein are implemented on non-transitory, computer-readable storage media appropriately programmed for computing devices. The non-transitory, computer-readable storage media participate in providing data, for example, instructions that are read by a computer, a processor, or a similar device. Where databases are described, it will be understood by one of ordinary skill in the art that (i) alternative database structures to those described may be employed, and (ii) other memory structures besides databases may be employed. Any illustrations or descriptions of any sample databases disclosed herein are illustrative arrangements for stored representations of information. In an embodiment, any number of other arrangements are employed besides those suggested by tables illustrated in the drawings or elsewhere. Similarly, any illustrated entries of the databases represent exemplary information only; one of ordinary skill in the art will understand that the number and content of the entries can be different from those disclosed herein. In another embodiment, despite any depiction of the databases as tables, other formats including relational databases, object-based models, and/or distributed databases are used to store and manipulate the data types disclosed herein. In an embodiment, object methods or behaviors of a database are used to implement various processes such as those disclosed herein. In another embodiment, the databases are, in a known manner, stored locally or remotely from a device that accesses data in such a database. In embodiments where there are multiple databases, the databases are integrated to communicate with each other for enabling simultaneous updates of data linked across the databases, when there are any updates to the data in one of the databases.

The embodiments disclosed herein are configured to operate in a network environment comprising one or more computers that are in communication with one or more devices via a network. In an embodiment, the computers communicate with the devices directly or indirectly, via a wired medium or a wireless medium such as the Internet, a local area network (LAN), a wide area network (WAN) or the Ethernet, a token ring, or via any appropriate communications mediums or combination of communications mediums. Each of the devices comprises processors that are adapted to communicate with the computers. In an embodiment, each of the computers is equipped with a network communication device, for example, a network interface card, a modem, or other network connection device suitable for connecting to a network. Each of the computers and the devices executes an operating system. While the operating system may differ depending on the type of computer, the operating system provides the appropriate communications protocols to establish communication links with the network. Any number and type of machines may be in communication with the computers.

The embodiments disclosed herein are not limited to a particular computer system platform, processor, operating system, or network. One or more of the embodiments disclosed herein are distributed among one or more computer systems, for example, servers configured to provide one or more services to one or more client computers, or to perform a complete task in a distributed system. For example, one or more of embodiments disclosed herein are performed on a client-server system that comprises components distributed among one or more server systems that perform multiple functions according to various embodiments. These components comprise, for example, executable, intermediate, or interpreted code, which communicate over a network using a communication protocol. The embodiments disclosed herein are not limited to be executable on any particular system or group of systems, and are not limited to any particular distributed architecture, network, or communication protocol.

The foregoing examples and illustrative implementations of various embodiments have been provided merely for explanation and are in no way to be construed as limiting of the present invention. While the present invention has been described with reference to various embodiments, illustrative implementations, drawings, and techniques, it is understood that the words, which have been used herein, are words of description and illustration, rather than words of limitation. Further, although the present invention has been described herein with reference to particular means, materials, embodiments, techniques, and implementations, the present invention is not intended to be limited to the particulars disclosed herein; rather, the present invention extends to all functionally equivalent structures, methods and uses, such as are within the scope of the appended claims. It will be understood by those skilled in the art, having the benefit of the teachings of this specification, that the present invention is capable of modifications and other embodiments may be effected and changes may be made thereto, without departing from the scope and spirit of the present invention.

What is claimed is:

1. A system for enhancing an expression of a digital pictorial image on a graphical user interface of an electronic device, the system comprising:
    an electronic device comprising an input device, at least one hardware processor, a memory unit operably and communicatively coupled to the at least one hardware processor, and a display unit;
    a sensing unit comprising one or more of a plurality of sensors operably coupled to the at least one hardware processor of the electronic device; and
    the at least one hardware processor comprising:
        an expression enhancing engine operably coupled to the sensing unit, and a messaging application deployed on the electronic device, wherein the expression enhancing engine comprises:
        an input detection module configured to receive a user selection of the digital pictorial image from the input device of the electronic device, in communication with the sensing unit, through one or more applications that are run on the at least one hardware processor;
        an image reconstruction module configured to enhance the expression of the digital pictorial image in real time through one or more applications that are run on the at least one hardware processor by:
            modifying a size of the digital pictorial image to a selected one of a preconfigured number of scaling sizes through a client application that are run on the at least one hardware processor;
            retrieving a media content associated with the user selection of the digital pictorial image from a data storage device; and reconstructing the digital pictorial image with the retrieved media content; and
        a display module configured to render the reconstructed digital pictorial image on the graphical user interface displayed on the display unit in real time through one or more applications that are run on the at least one hardware processor;
    wherein the image reconstruction module is configured for the reconstruction of the digital pictorial image by converting a unicode of the digital pictorial image into a digital image, and wherein the expression enhancing engine is configured to render a personalization interface on the display unit for receiving media content from a user to personalize the digital pictorial image based on user preferences, and wherein the expression enhancing engine is enabled on the electronic device, to display the customize option in a display list through a client application to edit or add a new emoji to a list of emojis and to store related data, to the data store of the electronic device and wherein the related data includes sounds, replacement images, and wherein expression enhancing engine creates hash maps through the client application that is run on the at least one processor to store the emojis and the related data as static components in the form of the hash maps or key-value pairs, in the data store, and wherein the client application is run on the at least one processor to store the newly added data and hash maps, and wherein the expression enhancing engine is configured to enhance the emojis and assets with brand requirements, thereby allowing users to serve as brand ambassadors by sharing share the branded digital pictorial images.

2. The system as claimed in claim 1, wherein the digital pictorial image is one of an emoji, a product image, and any combination thereof.

3. The system as claimed in claim 1, wherein the media content comprises one of textual content, image content, audio content, video content, audiovisual content, multimedia content, and any combination thereof.

4. The system as claimed in claim 1, wherein the image reconstruction module is configured to generate a sticker from one or more reconstructed digital pictorial images based on the selected one of the preconfigured number of scaling sizes received from the user via the input device.

5. The system as claimed in claim 1, wherein the display module is configured to playback audio content during the rendering of the reconstructed digital pictorial image on the graphical user interface in real time.

6. The system as claimed in claim 1, wherein the input detection module is configured to receive the user selection of the digital pictorial image via a long press action on the input device.

7. The system as claimed in claim 1, wherein the expression enhancing engine is operably coupled to a global positioning system component for reconstructing the digital pictorial image based on a location of the electronic device.

8. The system as claimed in claim 1, wherein the input device comprises a touch-enabled keyboard interface.

9. A method for enhancing an expression of a digital pictorial image on a graphical user interface of an electronic device, the method comprising:

rendering, by an input device of the electronic device, a touch-enabled keyboard interface on a display unit of the electronic device;

receiving, via the touch-enabled keyboard interface, a user selection of the digital pictorial image from the input device of the electronic device, by an expression enhancing engine in communication with a sensing unit;

modifying, by the expression enhancing engine, size of the digital pictorial image to a selected one of a preconfigured number of scaling sizes;

retrieving, by the expression enhancing engine, media content associated with the user selection of the digital pictorial image from a data storage device;

reconstructing, by the expression enhancing engine, the digital pictorial image with the retrieved media content to enhance the expression of the digital pictorial image in real time; and rendering, by the expression enhancing engine, the reconstructed digital pictorial image on the graphical user interface displayed on the display unit in real time;

rendering a personalization interface on the display unit by the expression enhancing engine for receiving media content from a user to personalize the digital pictorial image based on user preferences;

wherein the reconstruction of the digital pictorial image comprises converting a unicode of the digital pictorial image into a digital image by the expression enhancing engine, and wherein expression enhancing engine creates hash maps through the client application that is run on the at least one processor to store the emojis and the related data as static components in the form of the hash maps or key-value pairs, in the data store, and wherein the client application is run on the at least one processor to store the newly added data and hash maps, and wherein the expression enhancing engine is configured to enhance the emojis and assets with brand requirements, thereby allowing users to serve as brand ambassadors by sharing the branded digital pictorial images.

10. The method as claimed in claim 9, wherein the digital pictorial image is one of an emoji, a product image, and any combination thereof.

11. The method as claimed in claim 9, wherein the media content comprises one of textual content, image content, audio content, video content, audiovisual content, multimedia content, and any combination thereof.

12. The method as claimed in claim 9, comprising generating, by the expression enhancing engine, a sticker from one or more reconstructed digital pictorial images based on the selected one of the preconfigured number of scaling sizes received from the user via the input device.

13. The method as claimed in claim 9, comprising playing back audio content by the expression enhancing engine during the rendering of the reconstructed digital pictorial image on the graphical user interface in real time.

14. The method as claimed in claim 9, wherein the user selection of the digital pictorial image is received by the expression enhancing engine via a long press action on the input device.

15. The method as claimed in claim 9, wherein the digital pictorial image is reconstructed based on a location of the electronic device, by the expression enhancing engine in communication with a global positioning system component on the electronic device.

* * * * *